US012713091B2

(12) United States Patent
von Kugelgen et al.

(10) Patent No.: US 12,713,091 B2
(45) Date of Patent: Aug. 18, 2026

(54) TECHNIQUES FOR FLEXIBLE CONTROL OF PLAYBACK DEVICES

(71) Applicant: Sonos, Inc., Santa Barbara, CA (US)

(72) Inventors: Bruce Weathered von Kugelgen, Oakland, CA (US); Michael Nuzzolo, South Boston, MA (US); Michelle Diane Sintov, San Francisco, CA (US); Marisa McKently, Mountain View, CA (US); Damjan Stulic, San Francisco, CA (US); Paul Andrew Terry, Dublin, CA (US)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 18/691,574

(22) PCT Filed: Sep. 13, 2022

(86) PCT No.: PCT/US2022/043374
§ 371 (c)(1),
(2) Date: Mar. 13, 2024

(87) PCT Pub. No.: WO2023/039294
PCT Pub. Date: Mar. 16, 2023

(65) Prior Publication Data

US 2024/0414391 A1 Dec. 12, 2024

Related U.S. Application Data

(60) Provisional application No. 63/243,511, filed on Sep. 13, 2021.

(51) Int. Cl.

| | |
|---|---|
| ***H04N 21/436*** | (2011.01) |
| ***H04N 21/442*** | (2011.01) |
| *H04W 36/00* | (2009.01) |

(52) U.S. Cl.
CPC ..... *H04N 21/43615* (2013.01); *H04N 21/436* (2013.01); *H04N 21/442* (2013.01); *H04W 36/0022* (2013.01)

(58) Field of Classification Search
CPC ........... H04N 21/436; H04N 21/43615; H04N 21/442
See application file for complete search history.

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

EP 1389853 A1 2/2004
WO 200153994 7/2001
(Continued)

OTHER PUBLICATIONS

AudioTron Quick Start Guide, Version 1.0, Mar. 2001, 24 pages.
(Continued)

*Primary Examiner* — Rong Le

(57) ABSTRACT

An example computing device establishes a first network connection to a playback device that supports a first communication protocol for sending audio content for playback to the playback device, and detects user input associated with a modification to the playback. While the computing device and the playback device are connected to a common data network that supports a second communication protocol, the computing device transmits, via the common data network using the second communication protocol, a command to modify media playback based on the user input. While the computing device or playback device are not connected to the common data network that supports the second communication protocol, the computing device (i) establishes a second network connection to the playback
(Continued)

device that supports a third communication protocol, and (ii) transmits, via the second network connection using the third communication protocol, a command to modify media playback based on the user input.

21 Claims, 16 Drawing Sheets

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 11,038,937 | B1 * | 6/2021 | D'Amato ................ H04L 65/80 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2018/0270001 | A1 * | 9/2018 | Deshpande ............. H04W 4/90 |
| 2022/0377553 | A1 | 11/2022 | Lee et al. |

FOREIGN PATENT DOCUMENTS

| | | | |
|---|---|---|---|
| WO | 2003093950 | A2 | 11/2003 |
| WO | 2021162427 | A1 | 8/2021 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Bureau, International Search Report and Written Opinion mailed on Mar. 23, 2023, issued in connection with International Application No. PCTUS2022043374, filed on Sep. 13, 2022, 18 pages.
International Searching Authority, Invitation to Pay Additional Fees on Jan. 19, 2023, issued in connection with International Application No. PCT/US2022/043374, filed on Sep. 13, 2022, 10 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v.*D&M Holdings* (No. 14-1330-RGA), DI 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
International Bureau, International Search Report and Written Opinion mailed on Jun. 7, 2021, issued in connection with International Application No. PCT/US2022/043374, filed on Mar. 23, 2023, 18 pages.

* cited by examiner

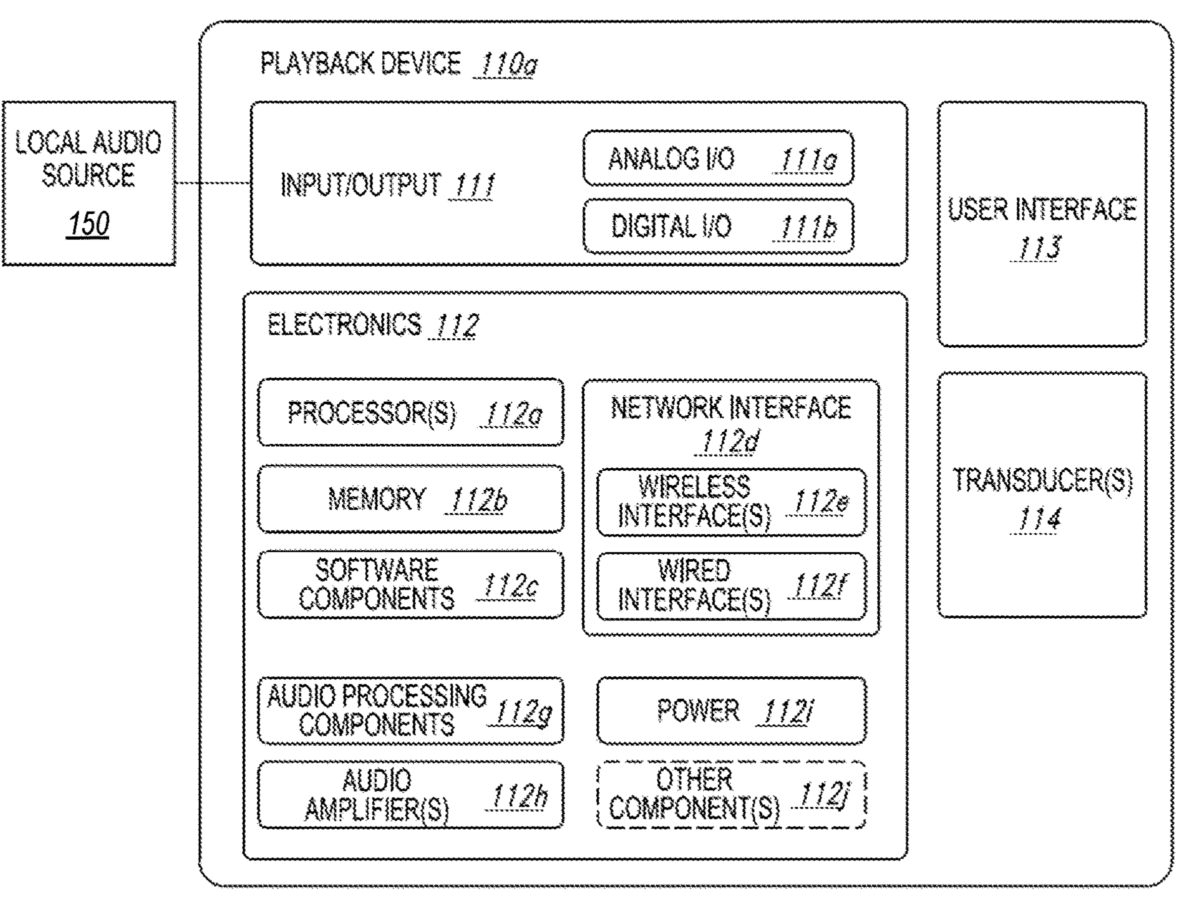
FIG. 1C
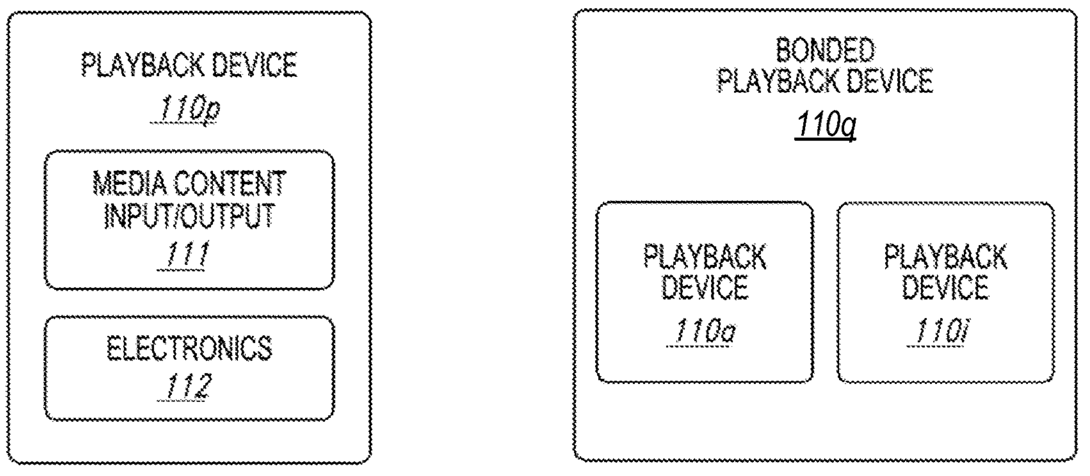
FIG. 1D
FIG. 1E

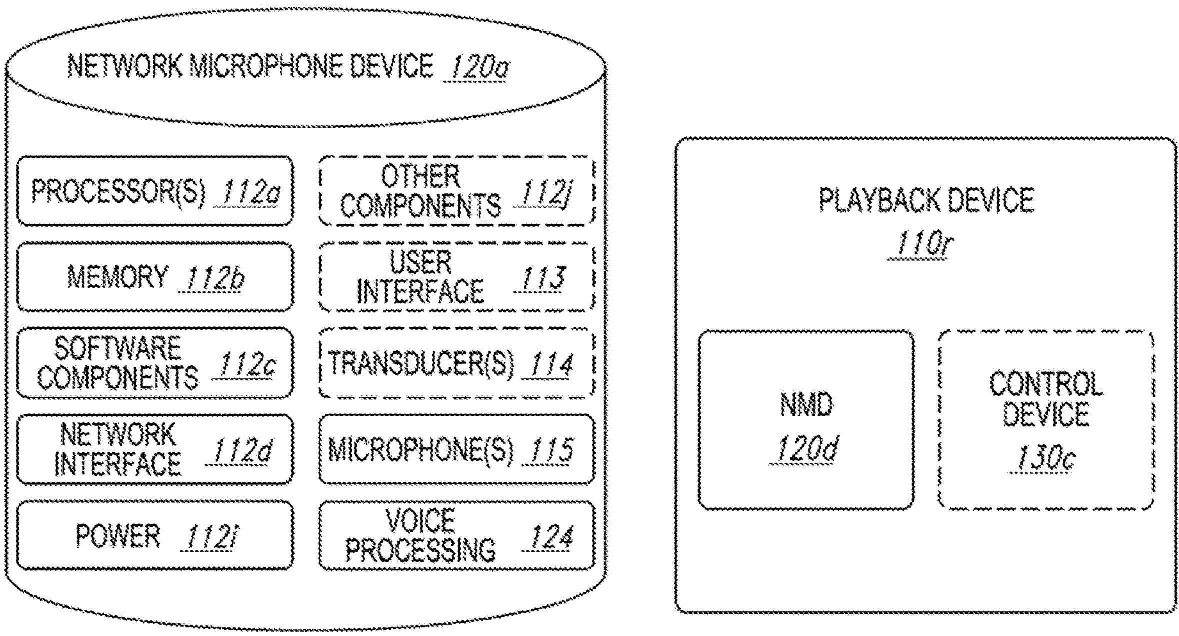
FIG. 1F
FIG. 1G
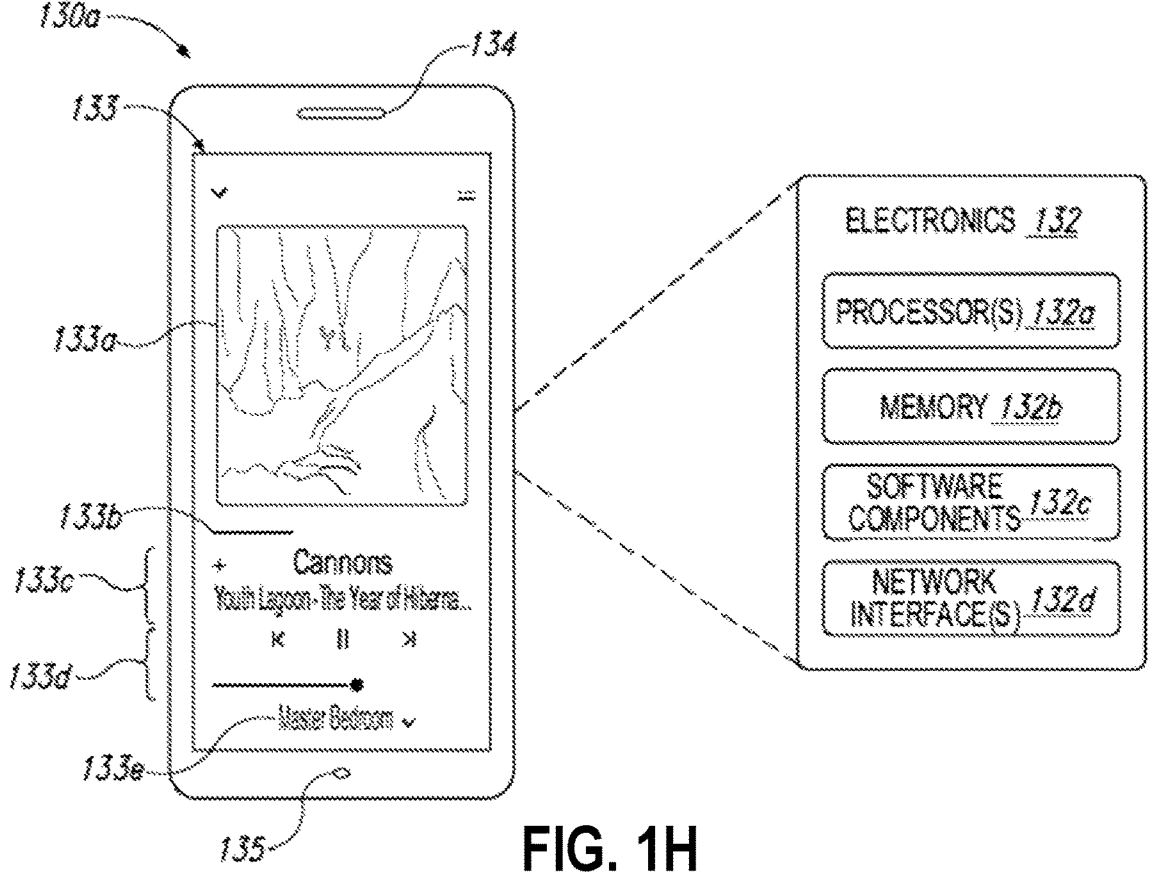
FIG. 1H

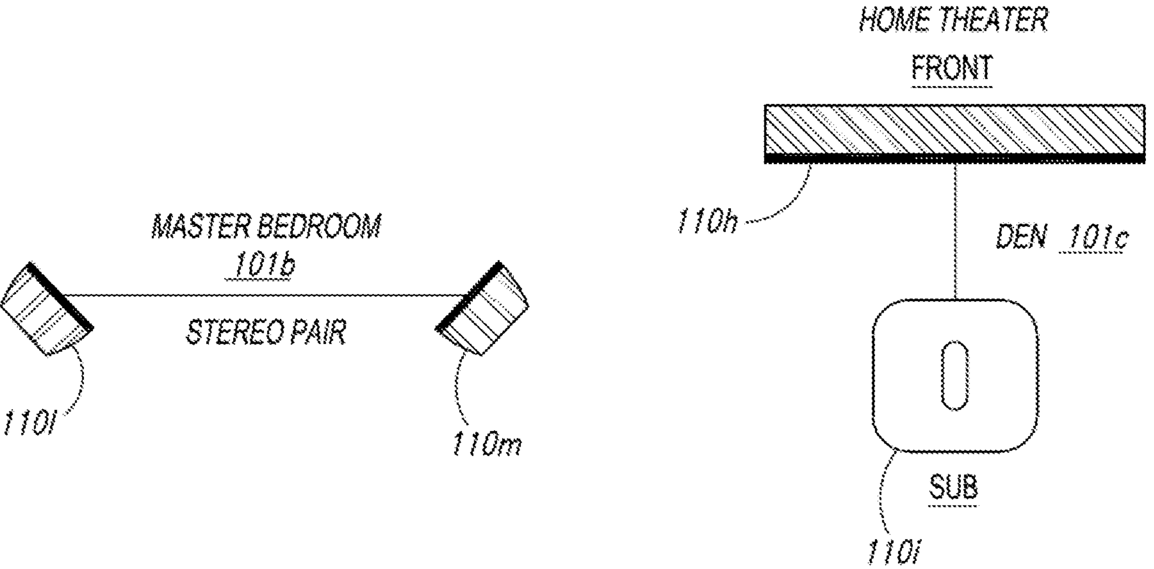
FIG. 1J
FIG. 1K
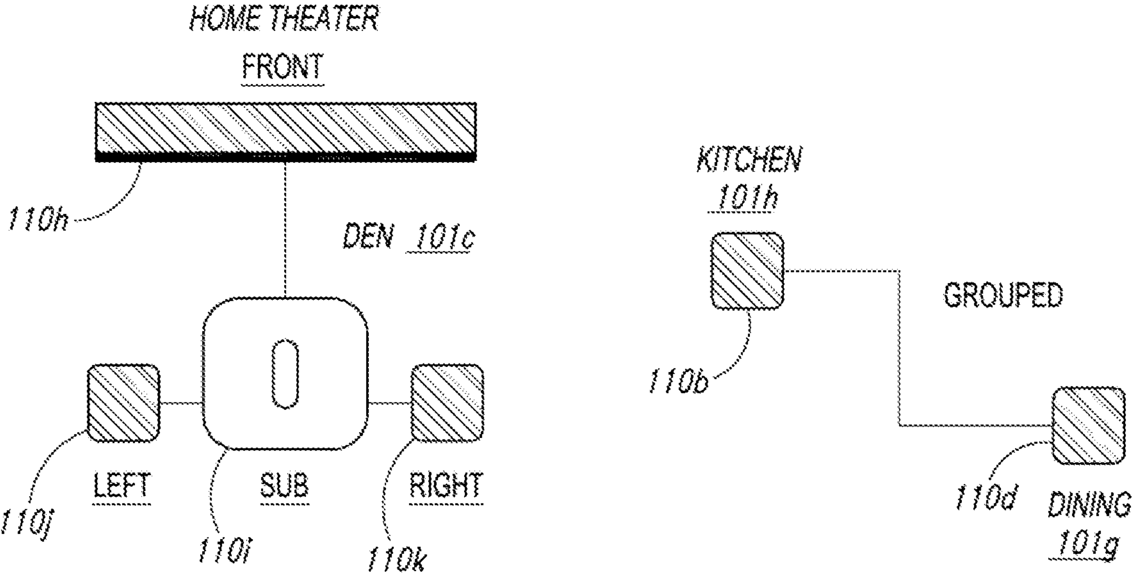
FIG. 1L
FIG. 1M

Figure 6A:
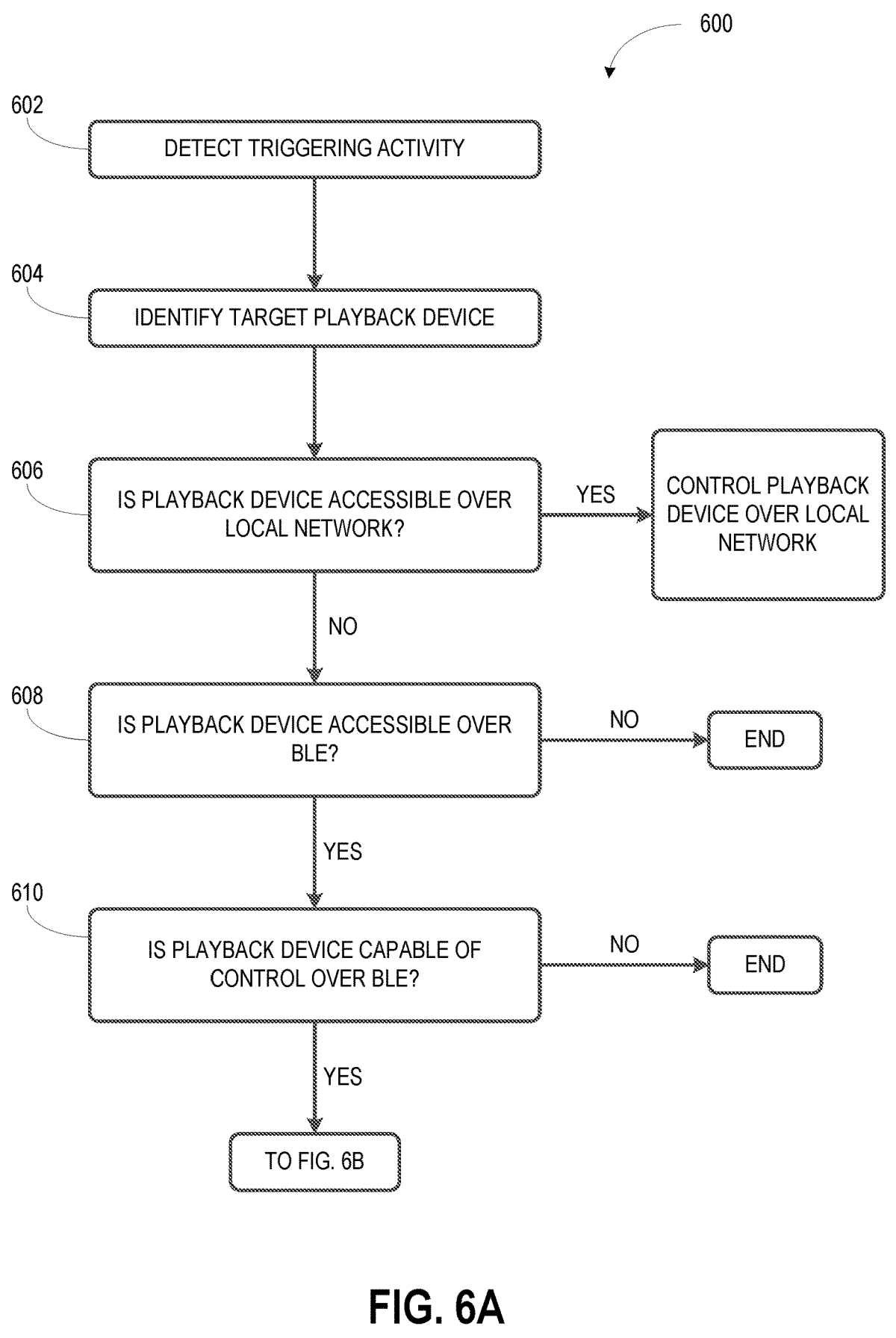

600

602 DETECT TRIGGERING ACTIVITY

604 IDENTIFY TARGET PLAYBACK DEVICE

606 IS PLAYBACK DEVICE ACCESSIBLE OVER LOCAL NETWORK?

YES → CONTROL PLAYBACK DEVICE OVER LOCAL NETWORK

NO

608 IS PLAYBACK DEVICE ACCESSIBLE OVER BLE?

NO → END

YES

610 IS PLAYBACK DEVICE CAPABLE OF CONTROL OVER BLE?

NO → END

YES

TECHNIQUES FOR FLEXIBLE CONTROL OF PLAYBACK DEVICES

CROSS-REFERENCE TO RELATED APPLICATIONS

This application is a national stage application under 35 U.S.C. § 371 of International Application No. PCT/US2022/043374, filed Sep. 13, 2022, which claims the benefit of priority from U.S. Provisional Application No. 63/243,511, filed Sep. 13, 2021. The disclosures of all of the above applications are incorporated by reference herein in their entireties.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1C is a block diagram of an example playback device.

FIG. 1D is a block diagram of an example playback device.

FIG. 1E is a block diagram of an example playback device.

FIG. 1F is a block diagram of an example network microphone device.

FIG. 1G is a block diagram of an example playback device.

FIG. 1H is a partially schematic diagram of an example control device.

FIGS. 1J through 1M are schematic diagrams of example corresponding media playback system zones.

FIG. 6A is a portion of a flowchart showing example operations for providing off-LAN control of a playback device.

Figure 1A:
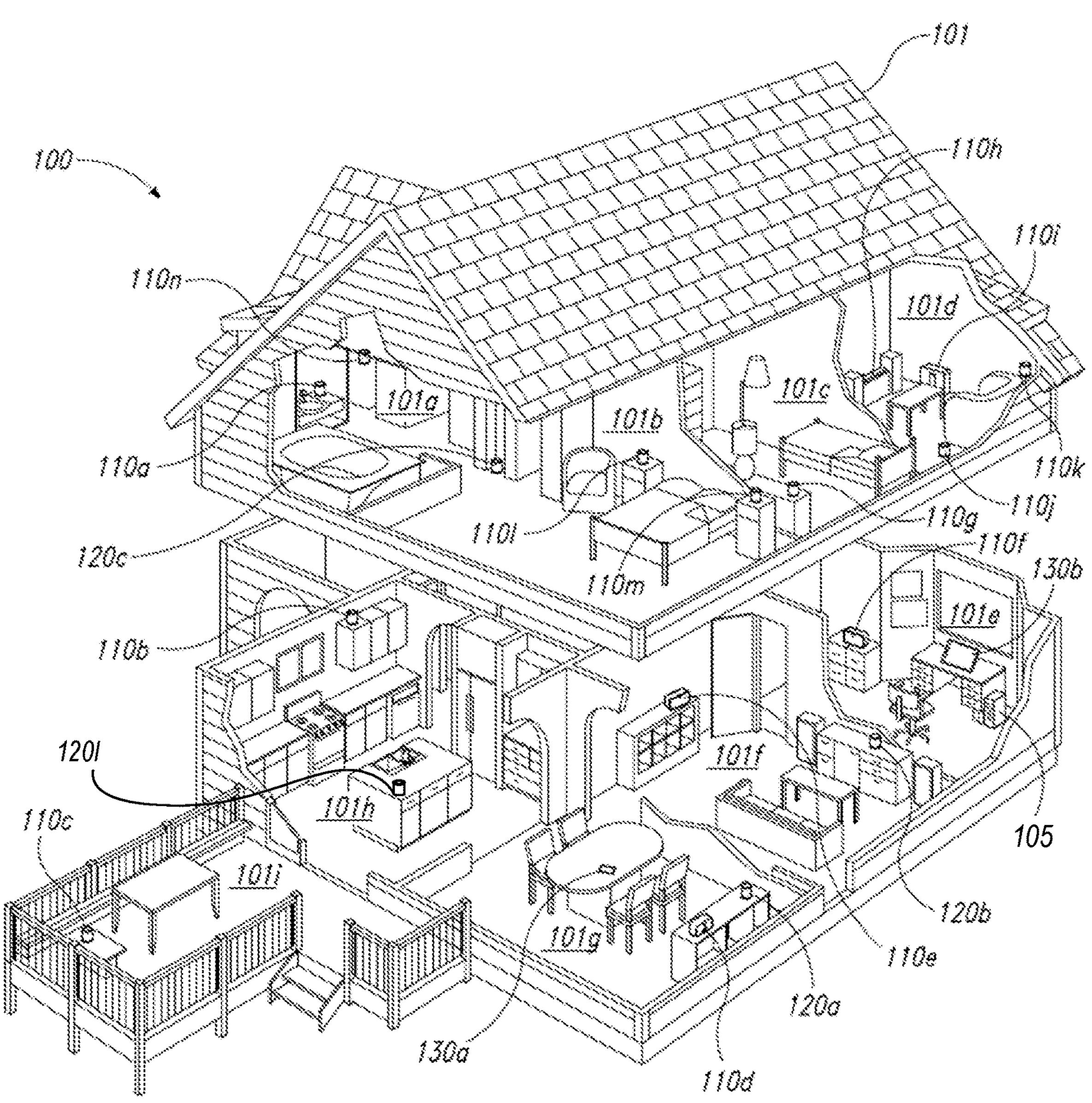
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

SONOS, Inc. has been a consistent innovator in the space of playback control over the past decade. For example, SONOS, Inc. led the transition from dedicated hardware controllers, such as the CR100 and CR200, to a controller application executable on a user's smartphone (or other computing device) with the introduction of the SONOS app. The controller application may allow a user to see status information of, and otherwise control, playback devices in the media playback system. For instance, the controller application, via a host computing device, can be configured to receive user input related to the media playback system and, in response, cause one or more devices in the media playback system to perform an action or operation corresponding to the user input. The action or operation can be, for example, related to initiating, stopping, or otherwise modifying playback of media content by the devices. In order to provide such functionality, the controller application, via the host computing device, may facilitate communication with various playback devices in the media playback system to obtain information identifying the playback devices and their operational statuses, which the controller application can use to display representations of the various playback devices in the media playback system.

This shift from dedicated hardware controllers to controller applications provides the end-user with an unprecedented degree of flexibility for playback control. Any computing device could be turned into a controller by simply downloading and installing a controller application. Consumers no longer had to purchase multiple dedicated hardware controllers to allow simultaneous control of different playback devices in a household by different users. Instead, each user in a household could simply download and install a controller application on their respective computing devices to enable simultaneous control.

Building upon such prior innovation, SONOS Inc. has appreciated that conventional controller applications are not without shortcomings. For example, conventional controller applications, via a host computing device, are generally designed to exclusively communicate with players over a reliable connection, such as over a Local Area Network (LAN) and/or Wide Area Network (WAN). Such conventional designs are based on the assumption(s) that: (1) the computing device executing the controller application is on the same Local Area Network (LAN), such as a WIFI network, as the playback device to be controlled; and/or (2) the computing device executing the controller application and the playback device both have a reliable connection to a common Wide Area Network (WAN), such as the Internet. While these assumptions may generally hold true when a user is in their home and controlling stationary playback devices (plugged into a wall outlet) in their living room, these assumptions break down for new portable playback devices (such as SONOS ROAM and SONOS MOVE) that may operate in other types of environments.

For illustration, a user may take a portable playback device to a remote location that is far away from any WIFI network and playback audio on the portable playback device via a BLUETOOTH Classic connection with their smartphone. In this situation, the portable playback device may be disconnected from any LAN and otherwise not have direct access to the Internet. As a result, a controller application on the user's smartphone is left without a mechanism for communicating with the portable playback device. This leaves the controller application unable to see status information (or otherwise control) the playback device. For playback control, the user must instead rely on the limited set of basic playback controls for a BLUETOOTH Classic connection integrated into an operating system of the smartphone (e.g., iOS, ANDROID, etc.). Thus, the full suite of control commands built into the controller application are unavailable to the user, such as: (1) adjusting audio equalization; (2) adjusting volume limit(s) (e.g., maximum volume); (3) modifying behavior of one or more status lights (e.g., turning off a status light); (4) modifying behavior of one or more control elements (e.g., disabling one or more buttons such as capacitive touch buttons); and/or (5) modifying behavior of a local voice assistant service (VAS) on the playback device.

Accordingly, aspects of the present disclosure relate to techniques for flexible control of playback devices that enable the full suite of playback command and control in a wide range of operating environments. For instance, a controller application may, via a host computing device, seamlessly transition from communicating with a playback device via a first communication mechanism (e.g., a LAN) to communicating with the playback device via a second communication mechanism (e.g., a BLUETOOTH Low Energy (BLE) connection) when the first communication mechanism is no longer available. As a result, a user is able to access the full suite of control commands available in the controller application regardless of the operating environment and without additional intervention.

To provide such flexible control, in some embodiments, the controller may detect triggering activity (e.g., associated with a playback device). For instance, the controller may detect establishment of a BLUETOOTH Classic connection to a playback device (e.g., a portable playback device). After the controller detects the triggering event, the playback device may identify a target playback device (e.g., associated with the triggering activity). For instance, the controller may obtain information identifying the target playback device from the Device Name or other metadata associated with the BLUETOOTH Classic connection. The controller may, in turn, determine whether the target playback device is accessible over a common LAN (e.g., a LAN that both the playback device and the controller are connected to). If the target playback device is accessible over a common LAN, the controller may operate in a state (and/or mode) where control commands are communicated to the target playback device over the common LAN. Otherwise, the controller may determine whether the playback device is capable of communication via another communication mechanism, such as BLE. For instance, the controller may detect a BLE beacon associated with the target playback device and, using information embedded in the BLE beacon, perform a lookup of the communication capabilities of that target playback device. If the controller identifies another communication mechanism that both the target playback device and the controller are capable of using (e.g., BLE), the controller may establish such a connection to the target playback device and operate in a state (and/or mode) where control commands are communicated to the target playback device over the new connection. As a result, the controller may seamlessly establish the proper connection to a playback device based on the operating environment to enable the full suite of playback device control without direct intervention from the user.

In some embodiments, the techniques described herein may be implemented in a computing device. The computing device may include at least one processor, at least one communication interface configured to facilitate communication using a first communication protocol, a second communication protocol that is different from the first communication protocol, and a third communication protocol that is different from the first and second communication protocols, at least one user interface, a non-transitory computer-readable medium, and program instructions stored on the non-transitory computer-readable medium that are executable by the at least one processor such that the computing device is configured to (i) establish a first network connection to a playback device that supports the first communication protocol, (ii) send, via the first network connection using the first communication protocol, audio content for playback to the playback device, (iii) detect, via the at least one user interface, user input associated with a modification to the playback by one or more playback devices, (iv) while the computing device and the playback device are connected to a common data network that supports the second communication protocol, transmit, via the common data network using the second communication protocol, at least one command to modify media playback by the one or more playback devices based on the detected user input, and (v) while at least one of the computing device or the playback device are not connected to the common data network that supports the second communication protocol, (a) establish a second network connection to the playback device that supports the third communication protocol, and (b) transmit, via the second network connection using the third communication protocol, at least one command to modify media playback by the one or more playback devices based on the detected user input.

In another aspect, a non-transitory computer-readable medium is provided. The non-transitory computer-readable medium is provisioned with program instructions that, when executed by at least one processor, cause a computing device to (i) establish, via at least one communication interface of the computing device, a first network connection to a playback device that supports a first communication protocol, wherein the at least one communication interface of the computing device is configured to facilitate communication using the first communication protocol, a second communication protocol that is different from the first communication protocol, and a third communication protocol that is different from the first and second communication protocols; (ii) send, via the first network connection using the first communication protocol, audio content for playback to the playback device; (iii) detect, via at least one user interface of the computing device, user input associated with a modification to the playback by one or more playback devices; (iv) while the computing device and the playback device are connected to a common data network that supports the second communication protocol, transmit, via the common data network using the second communication protocol, at least one command to modify media playback by the one or more playback devices based on the detected user input; and (v) while at least one of the computing device or the playback device are not connected to the common data network that supports the second communication protocol, (a) establish a second network connection to the playback device that supports the third communication protocol, and (b) transmit, via the second network connection using the third communication protocol, at least one command to modify media playback by the one or more playback devices based on the detected user input.

In yet another aspect, a method carried out by a computing device includes, (i) establishing, via at least one communication interface of the computing device, a first network connection to a playback device that supports a first communication protocol, wherein the at least one communication interface of the computing device is configured to facilitate communication using the first communication protocol, a second communication protocol that is different from the first communication protocol, and a third communication protocol that is different from the first and second communication protocols; (ii) sending, via the first network connection using the first communication protocol, audio content for playback to the playback device; (iii) detecting, via at least one user interface of the computing device, user input associated with a modification to the playback by one or more playback devices; (iv) while the computing device and the playback device are connected to a common data network that supports the second communication protocol, transmitting, via the common data network using the second communication protocol, at least one command to modify media playback by the one or more playback devices based on the detected user input; and (v) while at least one of the computing device or the playback device are not connected to the common data network that supports the second communication protocol, (a) establishing a second network connection to the playback device that supports the third communication protocol, and (b) transmitting, via the second network connection using the third communication protocol, at least one command to modify media playback by the one or more playback devices based on the detected user input.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

II. Suitable Operating Environment a. Suitable Media Playback System

Figure 1B:
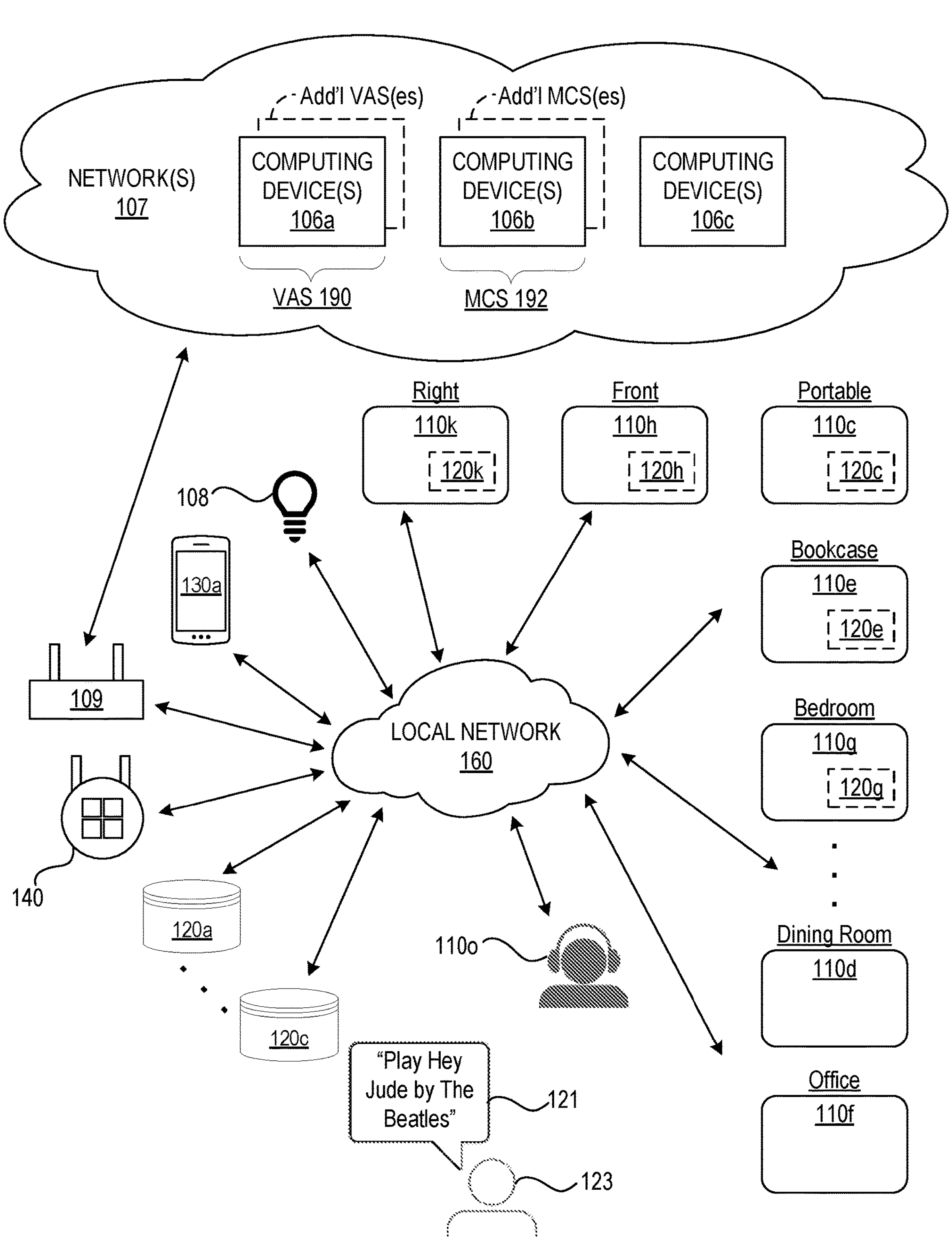
FIG. 1B is a schematic diagram of the media playback system of FIG. 1A and one or more networks.

FIGS. 1A and 1B illustrate an example configuration of a media playback system ("MPS") 100 in which one or more embodiments disclosed herein may be implemented. Referring first to FIG. 1A, a partial cutaway view of MPS 100 distributed in an environment 101 (e.g., a house) is shown. The MPS 100 as shown is associated with an example home environment having a plurality of rooms and spaces. The MPS 100 comprises one or more playback devices 110 (identified individually as playback devices 110*a-o*), one or more network microphone devices ("NMDs") 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the MPS 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the MPS 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the MPS 100 is configured to play back audio from a first playback device (e.g., the playback device 100*a*) in synchrony with a second playback device (e.g., the playback device 100*b*). Interactions between the playback devices 110, NMDs 120, and/or control devices 130 of the MPS 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The MPS 100 can comprise one or more playback zones, some of which may correspond to the rooms in the environment 101. The MPS 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the outdoor patio 101*i*. In some aspects, a single playback zone may include multiple rooms or spaces. In certain aspects, a single room or space may include multiple playback zones.

In the illustrated embodiment of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices.

Referring to FIG. 1B, the home environment may include additional and/or other computing devices, including local network devices, such as one or more smart illumination devices 108 (FIG. 1B), a smart thermostat 140, and a local computing device 105 (FIG. 1A). In embodiments described below, one or more of the various playback devices 110 may be configured as portable playback devices, while others may be configured as stationary playback devices. For example, the headphones 1100 (FIG. 1B) are a portable playback device, while the playback device 110*e* on the bookcase may be a stationary device. As another example, the playback device 110*c* on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices and/or other network devices of the MPS 100 may be coupled to one another via point-to-point connections and/or over other connections, which may be wired and/or wireless, via a local network 160 that may include a network router 109. For example, the playback device 110*j* in the Den 101*d* (FIG. 1A), which may be designated as the "Left" device, may have a point-to-point connection with the playback device 110*k*, which is also in the Den 101*d* and may be designated as the "Right" device. In a related embodiment, the Left playback device 110*j* may communicate with other network devices, such as the playback device 110*h*, which may be designated as the "Front" device, via a point-to-point connection and/or other connections via the local network 160.

The local network 160 may be, for example, a network that interconnects one or more devices within a limited area (e.g., a residence, an office building, a car, an individual's workspace, etc.). The local network 160 may include, for example, one or more local area networks (LANs) such as a wireless local area network (WLAN) (e.g., a WiFi network, a Z-Wave network, etc.) and/or one or more personal area networks (PANs) (e.g. a BLUETOOTH network, a wireless USB network, a ZigBee network, an IRDA network, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.12, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHZ, 6 GHZ, and/or another suitable frequency.

The MPS 100 is configured to receive media content from the local network 160. The received media content can comprise, for example, a Uniform Resource Identifier (URI) and/or a Uniform Resource Locator (URL). For instance, in some examples, the MPS 100 can stream, download, or otherwise obtain data from a URI or a URL corresponding to the received media content.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the environment 101 (FIG. 1A).

In some implementations, the various playback devices 110, NMDs 120, and/or control devices 130 may be communicatively coupled to at least one remote computing device associated with a voice assistant service ("VAS") and/or at least one remote computing device associated with a media content service ("MCS"). For instance, in the illustrated example of FIG. 1B, remote computing devices 106*a* are associated with a VAS 190 and remote computing devices 106*b* are associated with an MCS 192. Although only a single VAS 190 and a single MCS 192 are shown in the example of FIG. 1B for purposes of clarity, the MPS 100 may be coupled to multiple, different VASes and/or MCSes. In some embodiments, the various playback devices 110, NMDs 120, and/or control devices 130 may transmit data associated with a received voice input to a VAS configured to (i) process the received voice input data and (ii) transmit a corresponding command to the MPS 100. In some aspects, for example, the computing devices 106*a* may comprise one or more modules and/or servers of a VAS. In some implementations, VASes may be operated by one or more of SONOS®, AMAZON®, GOOGLE® APPLE®, MICROSOFT®, NUANCE®, or other voice assistant providers. In some implementations, MCSes may be operated by one or more of SPOTIFY, PANDORA, AMAZON MUSIC, GOOGLE PLAY, or other media content services.

In some embodiments, the local network 160 comprises a dedicated communication network that the MPS 100 uses to transmit messages between individual devices and/or to transmit media content to and from MCSes. In certain embodiments, the local network 160 is configured to be accessible only to devices in the MPS 100, thereby reducing interference and competition with other household devices. In other embodiments, however, the local network 160 comprises an existing household communication network (e.g., a household WiFi network). In some embodiments, the MPS 100 is implemented without the local network 160, and the various devices comprising the MPS 100 can communicate with each other, for example, via one or more direct connections, PANs, telecommunication networks (e,g., an LTE network or a 5G network, etc.), and/or other suitable communication links.

In some embodiments, audio content sources may be regularly added or removed from the MPS 100. In some embodiments, for example, the MPS 100 performs an indexing of media items when one or more media content sources are updated, added to, and/or removed from the MPS 100. The MPS 100 can scan identifiable media items in some or all folders and/or directories accessible to the various playback devices and generate or update a media content database comprising metadata (e.g., title, artist, album, track length) and other associated information (e.g., URIs, URLs) for each identifiable media item found. In some embodiments, for example, the media content database is stored on one or more of the various playback devices, network microphone devices, and/or control devices of MPS 100.

As further shown in FIG. 1B, the remote computing devices 106 further include remote computing device 106*c* configured to perform certain operations, such as remotely facilitating media playback functions, managing device and system status information, directing communications between the devices of the MPS 100 and one or multiple VASes and/or MCSes, among other operations. In one example, the remote computing devices 106*c* provide cloud servers for one or more SONOS Wireless HiFi Systems.

In various implementations, one or more of the playback devices 110 may take the form of or include an on-board (e.g., integrated) network microphone device configured to receive voice utterances from a user. For example, the playback devices 110*c*-110*h*, and 110*k* include or are otherwise equipped with corresponding NMDs 120*c*-120*h*, and 120*k*, respectively. A playback device that includes or is equipped with an NMD may be referred to herein interchangeably as a playback device or an NMD unless indicated otherwise in the description. In some cases, one or more of the NMDs 120 may be a stand-alone device. For example, the NMD 1201 may be a stand-alone device. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 110 and 120 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 110*e* because it is physically situated on a bookcase. Similarly, the NMD 1201 may be assigned the named "Island" because it is physically situated on an island countertop in the Kitchen 101*h* (FIG. 1A). Some playback devices may be assigned names according to a zone or room, such as the playback devices 110*g*, 110*d*, and 110*f*, which are named "Bedroom," "Dining Room," and "Office," respectively. Further, certain playback devices may have functionally descriptive names. For example, the playback devices 110*k* and 110*h* are assigned the names "Right" and "Front," respectively, because these two devices are configured to provide specific audio channels during media playback in the zone of the Den 101*d* (FIG. 1A). The playback device 110*c* in the Patio may be named "Portable" because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 120 are configured to interact with the VAS 190 over the local network 160 and/or the router 109. Interactions with the VAS 190 may be initiated, for example, when an NMD identifies in the detected sound a potential wake word. The identification causes a wake-word event, which in tum causes the NMD to begin transmitting detected-sound data to the VAS 190. In some implementations, the various local network devices 105, 110, 120, and 130 (FIG. 1A) and/or remote computing devices 106*c* of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. Patent Publication No. 2017-0242653 published Aug. 24, 2017, and titled "Voice Control of a Media Playback System," which is incorporated herein by reference in its entirety.

Upon receiving the stream of sound data, the VAS 190 may determine if there is voice input in the streamed data from the NMD, and if so the VAS 190 may also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 110*e* in the environment 101 (FIG. 1A) is in relatively close proximity to the NMD-equipped Living Room playback device 120*b*, and both devices 110*e* and 120*b* may at least sometimes detect the same sound. In such cases, this may require arbitration as to which device is ultimately responsible for providing detected-sound data to the remote VAS. Examples of arbitrating between NMDs may be found, for example, in previously referenced U.S. Patent Publication No. 2017-0242653.

In certain implementations, an NMD may be assigned to, or otherwise associated with, a designated or default playback device that may not include an NMD. For example, the Island NMD 120*l* in the Kitchen 101*h* (FIG. 1A) may be assigned to the Dining Room playback device 110*d*, which is in relatively close proximity to the Island NMD 120*l*. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Patent Publication No. 2017-0242653.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback devices 110, network microphone devices 120, and/or control devices 130. For example, the technologies herein may be utilized within an environment having a single playback device 110 and/or a single NMD 120. In some examples of such cases, the local network 160 (FIG. 1B) may be eliminated and the single playback device 110 and/or the single NMD 120 may communicate directly with the remote computing devices 106*a-c*. In some embodiments, a telecommunication network (e.g., an LTE network, a 5G network, etc.) may communicate with the various playback devices 110, network microphone devices 120, and/or control devices 130 independent of the local network 160.

b. Suitable Playback Devices

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111*b* includes one or more wireless communication links comprising, for example, a radio frequency (RF), infrared, WiFi, BLUETOOTH, or another suitable communication protocol. In certain embodiments, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 150 via the input/output 111 (e.g., a cable, a wire, a PAN, a BLUETOOTH connection, an ad hoc wired or wireless communication network, and/or another suitable communication link). The local audio source 150 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 150 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 150. In other embodiments, however, the media playback system omits the local audio source 150 altogether. In some embodiments, the playback device 110*a* does not include an input/output 111 and receives all audio content via the local network 160.

The playback device 110*a* further comprises electronics 112, a user interface 113 (e.g., one or more buttons, knobs, dials, touch-sensitive surfaces, displays, touchscreens), and one or more transducers 114 (e.g., a driver), referred to hereinafter as "the transducers 114." The electronics 112 is configured to receive audio from an audio source (e.g., the local audio source 150) via the input/output 111, one or more of the computing devices 106*a-c* via the local network 160 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power components 112*i* (e.g., one or more power supplies, power cables, power receptacles, batteries, induction coils, Power-over Ethernet (POE) interfaces, and/or other suitable sources of electric power).

In some embodiments, the electronics 112 optionally include one or more other components 112*j* (e.g., one or more sensors, video displays, touchscreens, battery charging bases). In some embodiments, the playback device 110*a* and electronics 112 may further include one or more voice processing components that are operable coupled to one or more microphones, and other components as described below with reference to FIGS. 1F and 1G.

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some embodiments, the operations further include causing the playback device 110*a* to send audio data to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the MPS 100. In some aspects, for example, the state data is shared during predetermined intervals of time (e.g., every 5 seconds, every 10 seconds, every 60 seconds) among at least a portion of the devices of the MPS 100, so that one or more of the devices have the most recent data associated with the MPS 100.

The network interface 112*d* is configured to facilitate a transmission of data between the playback device 110*a* and one or more other devices on a data network. The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the local network 160 (FIG. 1B) in accordance with a suitable wireless communication protocol (e.g., WiFi, BLUETOOTH, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

In some implementations, the power components 112*i* of the playback device 110*a* may additionally include an internal power source (e.g., one or more batteries) configured to power the playback device 110*a* without a physical connection to an external power source. When equipped with the internal power source, the playback device 110*a* may operate independent of an external power source. In some such implementations, an external power source interface may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The user interface 113 may facilitate user interactions independent of or in conjunction with user interactions facilitated by one or more of the control devices 130 (FIG. 1A). In various embodiments, the user interface 113 includes one or more physical buttons and/or supports graphical interfaces provided on touch sensitive screen(s) and/or surface(s), among other possibilities, for a user to directly provide input. The user interface 113 may further include one or more of lights (e.g., LEDs) and the speakers to provide visual and/or audio feedback to a user.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

In some embodiments, the playback device 110*a* may include a speaker interface for connecting the playback device to external speakers. In other embodiments, the playback device 110*a* may include an audio interface for connecting the playback device to an external audio amplifier or audio-visual receiver.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT: AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with playback device 110*i*, is configured to render only the mid-range and high frequency components of a particular audio content, while the playback device 110*i* renders the low frequency component of the particular audio content. In some embodiments, the bonded playback device 110*q* includes additional playback devices and/or another bonded playback device.

Figures 3, 4:
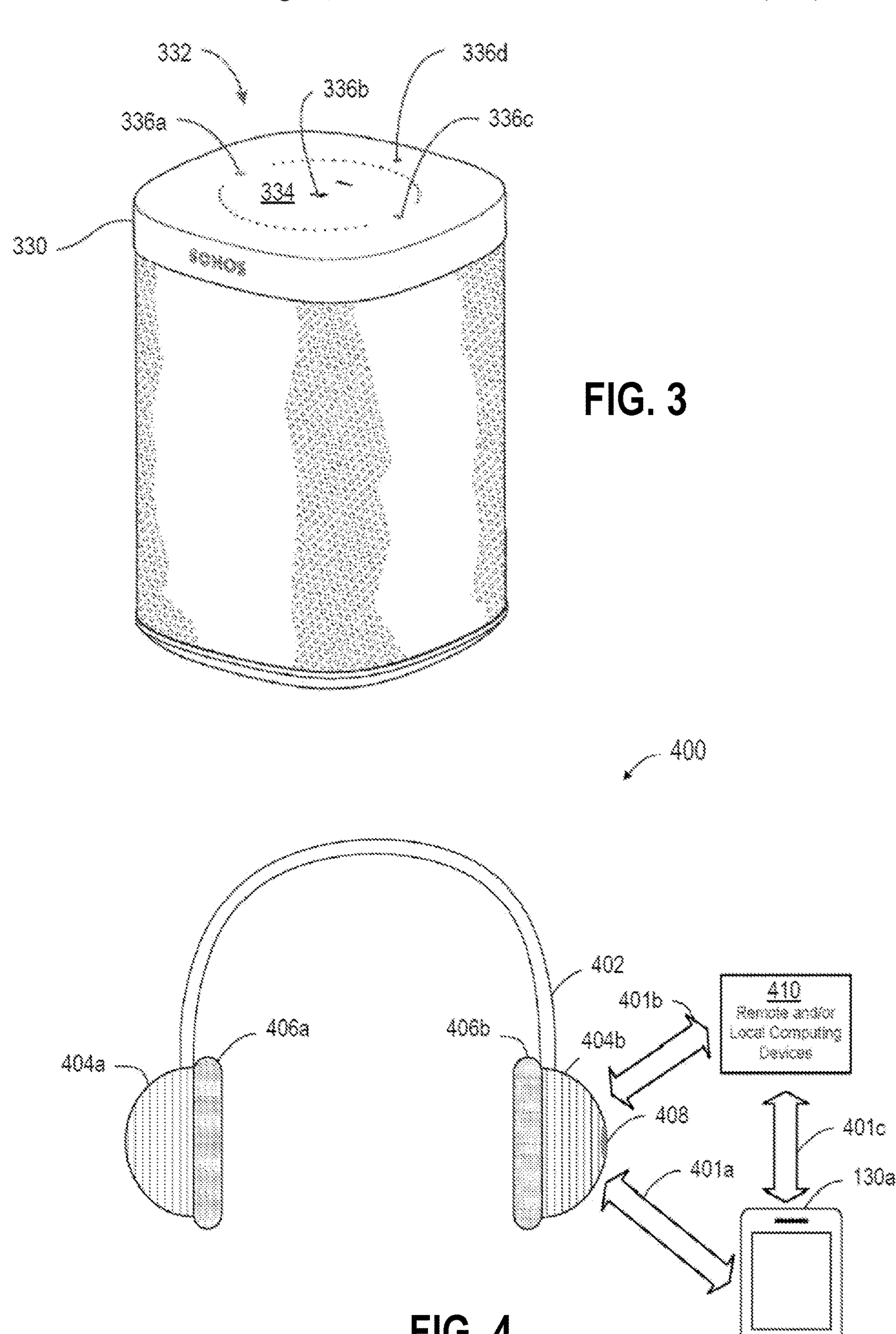
FIG. 3 is an isometric diagram of an example playback device housing.
FIG. 4 is a diagram of an example headset assembly for the playback device of FIG. 3.

In some embodiments, one or more of the playback devices 110 may take the form of a wired and/or wireless headphone (e.g., an over-ear headset, an on-ear headset, or an in-ear headset). For instance, FIG. 4 shows an example headset assembly 400 ("headset 400") for such an implementation of one of the playback devices 110. As shown, the headset 400 includes a headband 402 that couples a first earcup 404*a* to a second earcup 404*b*. Each of the earcups 404*a* and 404*b* may house any portion of the electronic components in the playback device 110, such as one or more speakers. Further, one or more of the earcups 404*a* and 404*b* may include a user interface for controlling audio playback, volume level, and other functions. The user interface may include any of a variety of control elements such as a physical button 408, a slider, a knob, and/or a touch control surface. As shown in FIG. 4, the headset 400 may further include ear cushions 406*a* and 406*b* that are coupled to earcups 404*a* and 404*b*, respectively. The ear cushions 406*a* and 406*b* may provide a soft barrier between the head of a user and the earcups 404*a* and 404*b*, respectively, to improve user comfort and/or provide acoustic isolation from the ambient (e.g., passive noise reduction (PNR)).

As described in greater detail below, the electronic components of a playback device may include one or more network interface components (not shown in FIG. 4) to facilitate wireless communication over one more communication links. For instance, a playback device may communicate over a first communication link 401*a* (e.g., a BLUETOOTH link) with one of the control devices 130 and/or over a second communication link 401*b* (e.g., a WiFi or cellular link) with one or more other computing devices 410 (e.g., a network router and/or a remote server). As another possibility, a playback device may communicate over multiple communication links, such as the first communication link 401*a* with the control device 130*a* and a third communication link 401*c* (e.g., a WiFi or cellular link) between the control device 130*a* and the one or more other computing devices 410. Thus, the control device 130*a* may function as an intermediary between the playback device and the one or more other computing devices 410, in some embodiments.

In some instances, the headphone device may take the form of a hearable device. Hearable devices may include those headphone devices (including ear-level devices) that are configured to provide a hearing enhancement function while also supporting playback of media content (e.g., streaming media content from a user device over a PAN, streaming media content from a streaming music service provider over a WLAN and/or a cellular network connection, etc.). In some instances, a hearable device may be implemented as an in-ear headphone device that is configured to playback an amplified version of at least some sounds detected from an external environment (e.g., all sound, select sounds such as human speech, etc.)

It should be appreciated that one or more of the playback devices 110 may take the form of other wearable devices separate and apart from a headphone. Wearable devices may include those devices configured to be worn about a portion of a subject (e.g., a head, a neck, a torso, an arm, a wrist, a finger, a leg, an ankle, etc.). For example, the playback devices 110 may take the form of a pair of glasses including a frame front (e.g., configured to hold one or more lenses), a first temple rotatably coupled to the frame front, and a second temple rotatable coupled to the frame front. In this example, the pair of glasses may comprise one or more transducers integrated into at least one of the first and second temples and configured to project sound towards an ear of the subject.

c. Suitable Network Microphone Devices (NMD)s

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the transducers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing components 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing components 124 (FIG. 1F). The microphones 115 are configured to detect sound (i.e., acoustic waves) in the environment of the playback device 110*r*, which is then provided to voice processing components 124. More specifically, each microphone 115 is configured to detect sound and convert the sound into a digital or analog signal representative of the detected sound, which can then cause the voice processing component to perform various functions based on the detected sound, as described in greater detail below. In some implementations, the microphones 115 may be arranged as an array of microphones (e.g., an array of six microphones). In some implementations the playback device 110*r* may include fewer than six microphones or more than six microphones. The playback device 110*r* optionally includes an integrated control device 130*c*. The control device 130*c* can comprise, for example, a user interface configured to receive user input (e.g., touch input, voice input) without a separate control device. In other embodiments, however, the playback device 110*r* receives commands from another control device (e.g., the control device 130*a* of FIG. 1B).

In operation, the voice-processing components 124 are generally configured to detect and process sound received via the microphones 115, identify potential voice input in the detected sound, and extract detected-sound data to enable a VAS, such as the VAS 190 (FIG. 1B), to process voice input identified in the detected-sound data. The voice processing components 124 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 124 may include or otherwise take the form of one or more DSPs or one or more modules of a DSP. In this respect, certain voice processing components 124 may be configured with particular parameters (e.g., gain and/or spectral parameters) that may be modified or otherwise tuned to achieve particular functions. In some implementations, one or more of the voice processing components 124 may be a subcomponent of the processor 112*a*.

In some implementations, the voice-processing components 124 may detect and store a user's voice profile, which may be associated with a user account of the MPS 100. For example, voice profiles may be stored as and/or compared to variables stored in a set of command information or data table. The voice profile may include aspects of the tone of frequency of a user's voice and/or other unique aspects of the user's voice, such as those described in previously-referenced U.S. Patent Publication No. 2017-0242653.

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing components 124 receive and analyze the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing components 124 monitor the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Controller Devices

FIG. 1H is a partially schematic diagram of one of the control device 130*a* (FIGS. 1A and 1B). As used herein, the term "control device" can be used interchangeably with "controller," "control device," or "control system." Among other features, the control device 130*a* is configured to receive user input related to the MPS 100 and, in response, cause one or more devices in the MPS 100 to perform an action(s) or operation(s) corresponding to the user input. In the illustrated embodiment, the control device 130*a* comprises a smartphone (e.g., an iPhone™. an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the MPS 100. In other embodiments, as described above with respect to FIG. 1G, the control device 130*a* is integrated into another device in the MPS 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the MPS 100. The memory 132*b* can comprise data storage that can be loaded with one or more of the software components executable by the processor 302 to perform those functions. The software components 132*c* can comprise applications and/or other executable software configured to facilitate control of the MPS 100. The memory 112*b* can be configured to store, for example, the software components 132*c*, media playback system controller application software, and/or other data associated with the MPS 100 and the user.

The network interface 132*d* is configured to facilitate network communications between the control device 130*a* and one or more other devices in the MPS 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.12, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 130*a* to one or more of the playback devices 110. The network interface 132*d* can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others. Additional description of zones and groups can be found below with respect to FIGS. 1J through 2.

Figure 1I:
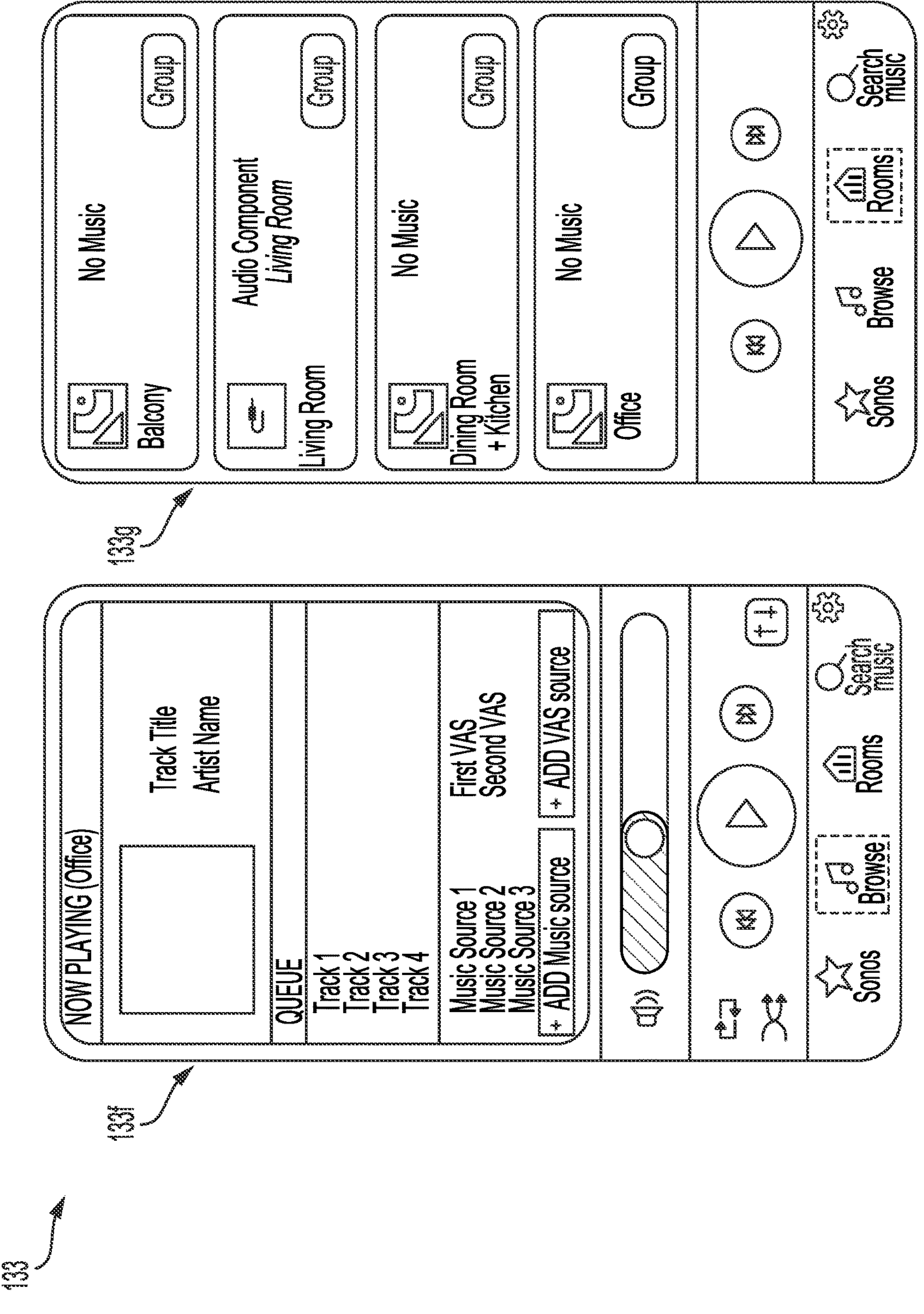
FIG. 1I is a schematic diagram of example user interfaces of the example control device of FIG. 1H.

The user interface 133 is configured to receive user input and can facilitate control of the MPS 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system. FIG. 1I shows two additional user interface displays 133*f* and 133*g* of user interface 133. Additional examples are also possible.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

e. Suitable Playback Device Configurations

Figure 2:
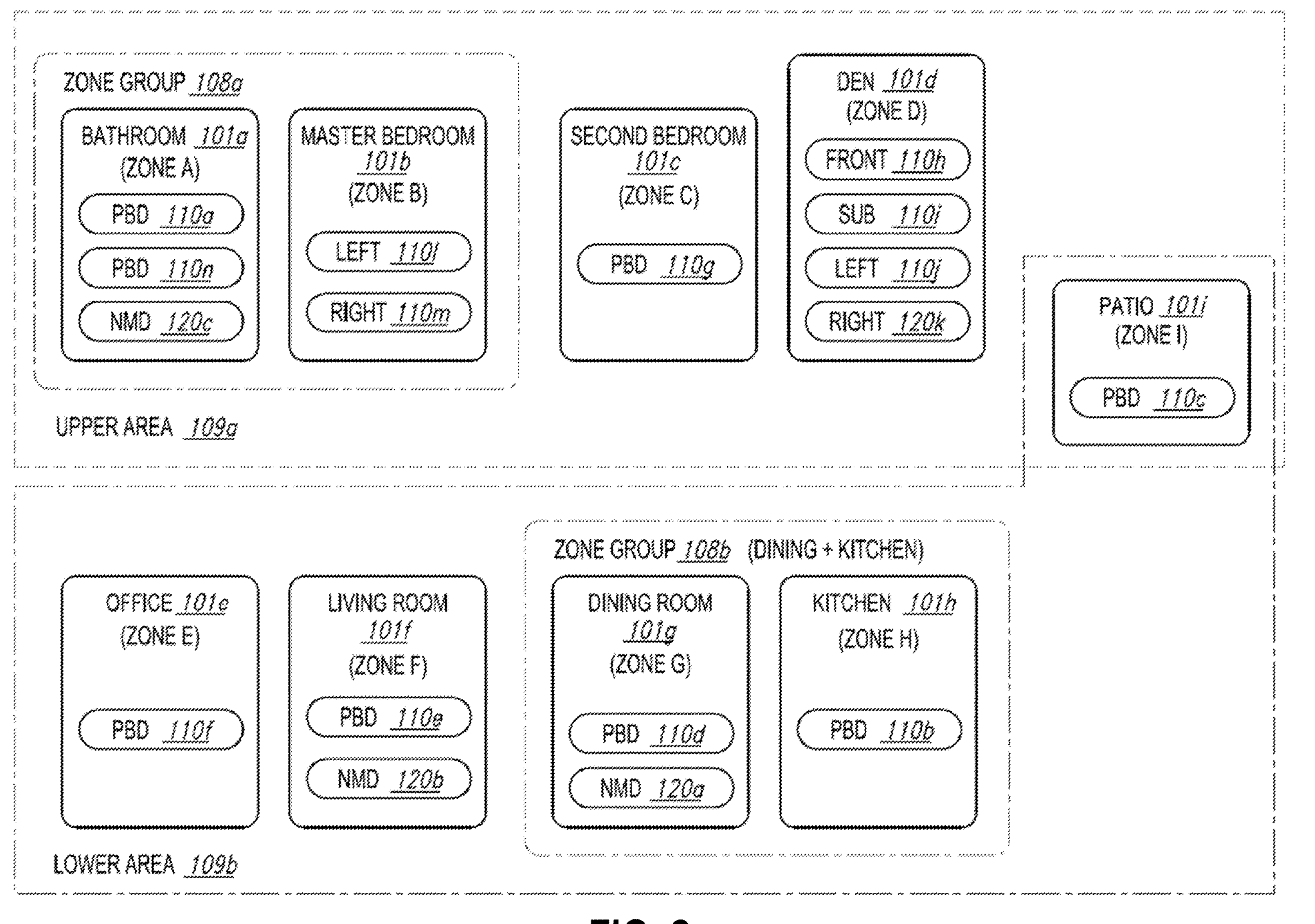
FIG. 2 is a schematic diagram of example media playback system areas.

FIGS. 1J through 2 show example configurations of playback devices in zones and zone groups. Referring first to FIG. 2, in one example, a single playback device may belong to a zone. For example, the playback device 110*g* in the second bedroom 101*c* (FIG. 1A) may belong to Zone C. In some implementations described below, multiple playback devices may be "bonded" to form a "bonded pair" which together form a single zone. For example, the playback device 110*l* (e.g., a left playback device) can be bonded to the playback device 110*m* (e.g., a right playback device) to form Zone A. Bonded playback devices may have different playback responsibilities (e.g., channel responsibilities). In another implementation described below, multiple playback devices may be merged to form a single zone. For example, the playback device 110*h* (e.g., a front playback device) may be merged with the playback device 110*i* (e.g., a subwoofer), and the playback devices 110*j* and 110*k* (e.g., left and right surround speakers, respectively) to form a single Zone D. In another example, the playback zones 110*g* and 110*h* can be merged to form a merged group or a zone group 108*b*. The merged playback zones 110*g* and 110*h* may not be specifically assigned different playback responsibilities. That is, the merged playback zones 110*h* and 110*i* may, aside from playing audio content in synchrony, each play audio content as they would if they were not merged.

Each zone in the MPS 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1J, the playback devices 110*l* and 110*m* may be bonded so as to produce or enhance a stereo effect of audio content. In this example, the playback device 110*l* may be configured to play a left channel audio component, while the playback device 110*k* may be configured to play a right channel audio component. In some implementations, such stereo bonding may be referred to as "pairing."

Additionally, bonded playback devices may have additional and/or different respective speaker drivers. As shown in FIG. 1K, the playback device 110*h* named Front may be bonded with the playback device 110*i* named SUB. The Front device 110*h* can be configured to render a range of mid to high frequencies and the SUB device 110*i* can be configured render low frequencies. When unbonded, however, the Front device 110*h* can be configured render a full range of frequencies. As another example, FIG. 1L shows the Front and SUB devices 110*h* and 110*i* further bonded with Left and Right playback devices 110*j* and 110*k*, respectively. In some implementations, the Right and Left devices 110*j* and 110*k* can be configured to form surround or "satellite" channels of a home theater system. The bonded playback devices 110*h*, 110*i*, 110*j*, and 110*k* may form a single Zone D (FIG. 2).

Playback devices that are merged may not have assigned playback responsibilities and may each render the full range of audio content the respective playback device is capable of. Nevertheless, merged devices may be represented as a single UI entity (i.e., a zone, as discussed above). For instance, the playback devices 110*a* and 110*n* in the master bathroom have the single UI entity of Zone A. In one embodiment, the playback devices 110*a* and 110*n* may each output the full range of audio content each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 2, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108*b* can have be assigned a name such as "Dining+Kitchen", as shown in FIG. 2. In some embodiments, a zone group may be given a unique name selected by a user.

Certain data may be stored in a memory of a playback device (e.g., the memory 112*b* of FIG. 1C) as one or more state variables that are periodically updated and used to describe the state of a playback zone, the playback device(s), and/or a zone group associated therewith. The memory may also include the data associated with the state of the other devices of the media system and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101*c* may indicate that the playback device is the only playback device of the Zone C and not in a zone group. Identifiers associated with the Den may indicate that the Den is not grouped with other zones but includes bonded playback devices 110*h*-110*k*. Identifiers associated with the Dining Room may indicate that the Dining Room is part of the Dining+Kitchen zone group 108*b* and that devices 110*b* and 110*d* are grouped (FIG. 1M). Identifiers associated with the Kitchen may indicate the same or similar information by virtue of the Kitchen being part of the Dining+Kitchen zone group 108*b*. Other example zone variables and identifiers are described below.

In yet another example, the MPS 100 may include variables or identifiers representing other associations of zones and zone groups, such as identifiers associated with Areas, as shown in FIG. 2. An area may involve a cluster of zone groups and/or zones not within a zone group. For instance, FIG. 2 shows an Upper Area 109*a* including Zones A-D, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

FIG. 3 shows an example housing 330 of the playback device 110 that includes a user interface in the form of a control area 332 at a top portion 334 of the housing 330. The control area 332 includes buttons 336-*c* for controlling audio playback, volume level, and other functions. The control area 332 also includes a button 236*d* for toggling the microphones 222 to either an on state or an off state. The control area 332 is at least partially surrounded by apertures formed in the top portion 334 of the housing 330 through which the microphones 222 (not visible in FIG. 3) receive the sound in the environment of the playback device 110. The microphones 222 may be arranged in various positions along and/or within the top portion 334 or other areas of the housing 330 so as to detect sound from one or more directions relative to the playback device 110.

In some embodiments, the playback device 110 may take the form of a wired and/or wireless headphone (e.g., an over-ear headset, an on-ear headset, or an in-ear headset). For instance, FIG. 4 shows an example headset assembly 400 ("headset 400") for such an implementation of the playback device 110. As shown, the headset 400 includes a headband 402 that couples a first earcup 404*a* to a second earcup 404*b*. Each of the earcups 404*a* and 404*b* may house any portion of the electronic components in the playback device 110, such as one or more speakers. Further, one or more of the earcups 404*a* and 404*b* may include a user interface for controlling audio playback, volume level, and other functions. The user interface may include any of a variety of control elements such as a physical button 408, a slider, a knob, and/or a touch control surface. As shown in FIG. 4, the headset 400 may further include ear cushions 406*a* and 406*b* that are coupled to earcups 404*a* and 404*b*, respectively. The ear cushions 406*a* and 406*b* may provide a soft barrier between the head of a user and the earcups 404*a* and 404*b*, respectively, to improve user comfort and/or provide acoustic isolation from the ambient (e.g., passive noise reduction (PNR)).

III. Example Techniques Involving Off-LAN Control of Playback Devices

As described above in connection with FIG. 1H, a controller, such as control device 130*a*, can be configured to receive user input related to a media playback system, such as MPS 100, and, in response, cause one or more devices in the media playback system to perform an action corresponding to the user input. To facilitate this, the controller can include data storage that is loaded with media playback system controller application software, and one or more processors of the controller can execute the controller application software to facilitate receiving the user input and causing the playback devices in the media playback system to perform the corresponding action.

As further described above in connection with FIG. 1B, the controller and the playback devices can communicate with one another over a local network, such as local network 160. For purposes of the following examples, the local network 160 may comprise a common data network that supports a particular communication protocol. In some examples, the local network 160 can comprise a local area network, such as a WLAN, and the controller and playback devices connected to the local network can communicate with one another using an 802.11-based protocol. For instance, the controller can cause the playback devices to perform various actions by sending commands to the playback devices over the local network using the 802.11-based protocol.

The controller can structure the commands themselves according to a common media playback protocol that the controller, playback devices, and other devices in the media playback system are configured to support. The media playback protocol can take various forms. In some examples, the media playback protocol can define a set of commands. A command can include a header and a body. The header of the command can define the name or type of the command, as well as information about the target recipient of the command, such as an identifier of a playback device or a group of playback devices. The body of the command can contain parameters specific to the command, such as a parameter name and a parameter value. For instance, for a command to change the volume, the body can contain a "volume" parameter name and a numerical volume setting for the parameter value.

The media playback system can process commands according to a request-reply message pattern, such that when a controller sends a request (i.e., a command), a corresponding reply is returned. Like the command, the reply can include a header and a body. Also like the header of the command, the header of the reply can include the name or type of the command to which the reply corresponds, as well as the identifier of the target recipient of the command. Further, the header of the reply can include a Boolean success field indicating whether the command was successfully carried out. When the command includes a request for returned data, the body of the corresponding reply can include the requested data. When the command does not include a request for returned data, such as when sending a command to adjust the volume, the body of the corresponding reply can be empty, as the Boolean success field in the header provides the information of interest (i.e., whether the command was successfully executed).

The media playback protocol can further support sending notifications to the controller to provide the controller with up-to-date operational status information for various playback devices in the media playback system. Notifications can have a message format similar to that of commands (e.g., with a similar header and body format) so that the notifications can route data to and from the appropriate devices. However, notifications can be processed according to a different message pattern than that of commands. Instead of using a request-reply message pattern, notifications can be triggered when a controller subscribes to a particular notification, and whenever a state of a data object in the subscribed notification changes. For instance, the controller can send a subscription request message to a playback device to subscribe to playback status notifications for that playback device or for one or more other playback devices in the media playback system. Once the controller has subscribed to playback status notifications, the playback device or the one or more other playback devices in the media playback system can send a notification message to the controller whenever there is a change to a data object related to the playback status of media content by any or all of the playback devices in the media playback system, such as a data object indicating whether a playback device is paused or currently playing media content, a data object identifying the media content, or a data object identifying the current playback position in the media content.

Other notifications can be used in connection with other operational parameters of the playback devices as well. Examples of other operational parameters that the controller can monitor by subscribing to notifications can include current volume settings, album art of currently playing media content, metadata of currently playing media content, current equalization settings, temperature status, telemetry or diagnostic information, battery status, charger or power adapter compatibility information, information identifying any currently connected controller that is streaming media content to a playback device, or information identifying whether BLUETOOTH content is being streamed to a playback device. In this way, by subscribing to various notifications for the playback devices in a media playback system, the controller can continually receive up-to-date operational status information for each of the playback devices in the media playback system connected to the local network 160. And the controller can display some or all of this information as described above in connection with FIGS. 1H and 1I.

When devices in the media playback system send messages to one another using the above-described media playback protocol, such as in the form of a notification message or a command request or reply, the devices can leverage the local network 160 to route the messages to the appropriate device. Because the message header identifies the target device, any device that receives a message can refer to the header to determine the target device of the message and route the message to its intended recipient. Accordingly, the controller can send a command to a playback device different from the target recipient of the command, and the playback device that receives the command from the controller can identify the target recipient based on the command header and route the command to the target recipient.

While the media playback protocol has been described above in the context of a media playback system in which the controller and the playback devices are all connected to a common data network, such as local network 160, there may be scenarios in which the controller and/or one or more playback devices are not connected to the common data network. For instance, as described above in connection with FIG. 1B, a household may include one or more playback devices that are configured to communicate with the controller using a communication protocol that is incompatible with communication protocols supported by local network 160. In such situations, the controller may not be able to use the media playback protocol to control the one or more playback devices. For instance, the controller cannot use the media playback protocol to send command messages to a playback device over the local network 160 or to receive event messages from the playback device over the local network 160 if one or both of the controller or playback device are not configured to communicate over the local network 160.

In order to help address these issues, the following disclosure describes techniques for using the media playback protocol to control a playback device using off-LAN communications in a media playback system. Throughout this disclosure, communications that are referred to as "off-LAN" are communications that are not sent over a common LAN and/or WAN used by the media playback system, while communications that are referred to as "on-LAN" are communications that are sent over the common LAN and/or WAN used by the media playback system.

Figure 5A:
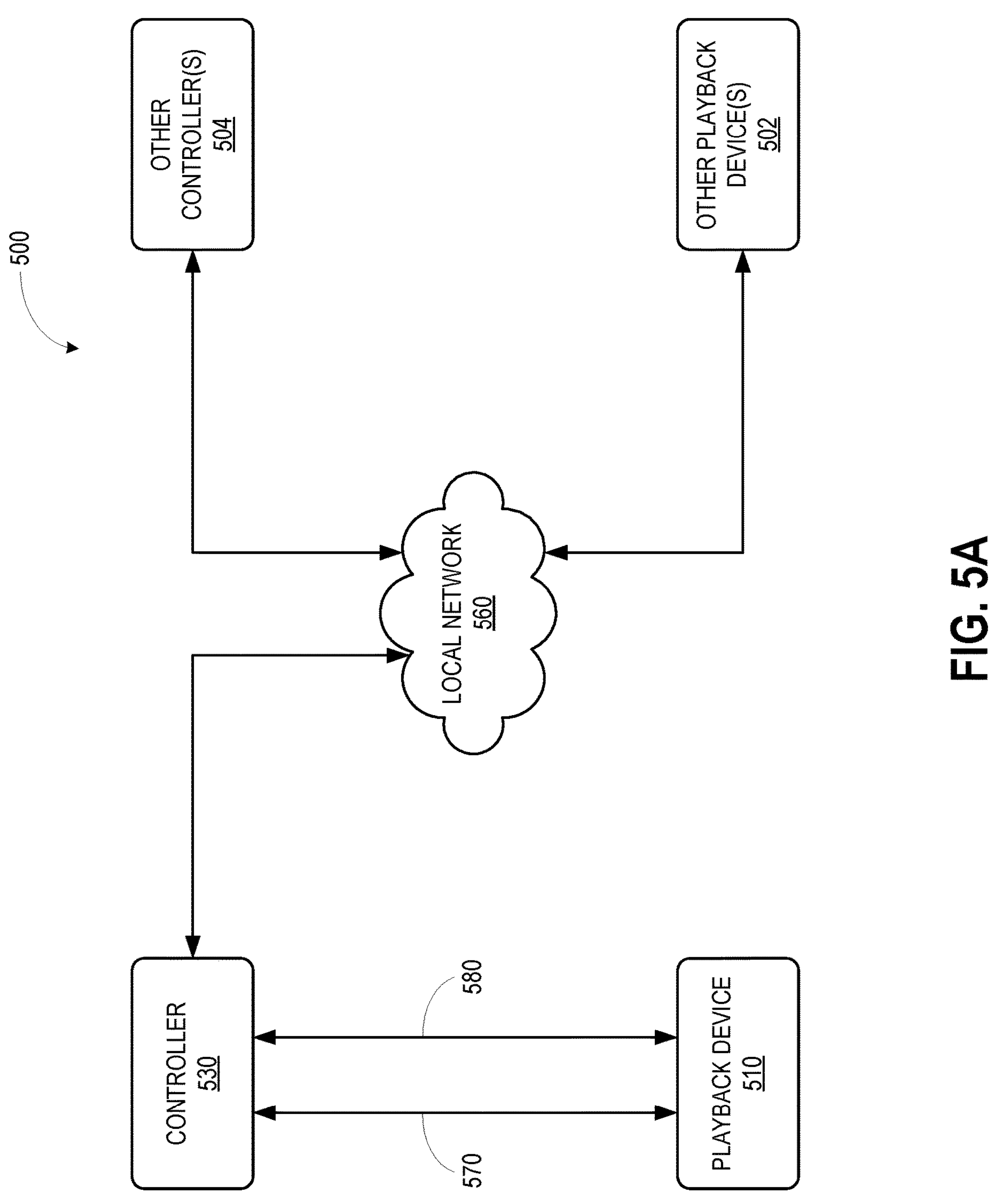
FIG. 5A is a schematic diagram of an example media playback system.
Figure 5B:
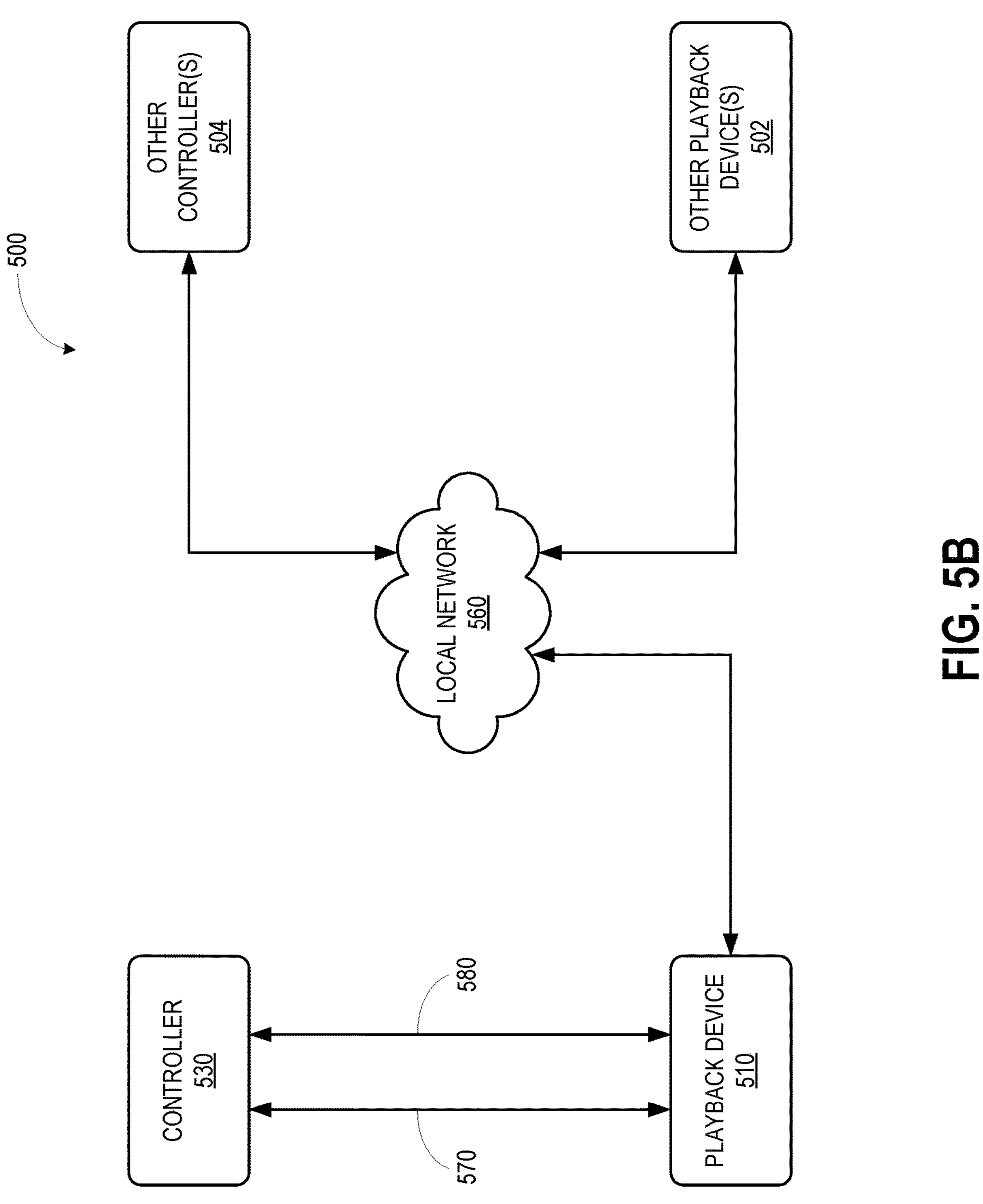
FIG. 5B is a schematic diagram of another example media playback system.

FIGS. 5A and 5B depict example configurations of a media playback system 500 in which a controller 530 and a playback device 510 are configured to communicate using a communication protocol that is incompatible with communication protocols supported by a local network 560 of the media playback system 500. The controller 530 can take the form of any of the controllers described herein, such as the controller 130*a* described in connection with FIG. 1H. The playback device 510 can take the form of any of the playback devices or NMDs described herein, such as those described in connection with FIGS. 1A-G, 1J-M, and 2-4. The local network 560 can take the form of any of the common data networks of media playback systems described herein, such as the local network 160 described in connection with FIG. 1B.

In addition to the controller 530 and the playback device 510, the media playback system 500 can further include one or more other playback devices 502 and/or one or more other controllers 504. These other playback devices 502 and other controllers 504 can similarly take the form of any of the playback devices and controllers described herein, respectively. As shown in FIGS. 5A and 5B, the other playback devices 502 and other controllers 504 are connected to the local network 560 and are configured to communicate with one another using on-LAN communications. For instance, one of the other controllers 504 may be configured to use a communication protocol supported by the local network 560, such as an 802.11-based protocol, to send a command message in accordance with the media playback protocol over the local network 560 to one of the other playback devices 502. Likewise, the other playback device(s) 502 may be configured to use the 802.11-based protocol to send a reply to the command message in accordance with the media playback protocol over the local network 560 to the other controller 504.

As further shown in FIGS. 5A and 5B, one or both of the controller 530 or the playback device 510 may not be connected to the local network 560. For instance, in the configuration shown in FIG. 5A, the controller 530 is connected to the local network 560, but the playback device 510 is not. This configuration may arise, for instance, if the playback device 510 is not configured for, or is not capable of, communicating with an access point of the local network 560. As an example, the playback device 510 may take the form of one of the portable devices described herein. Such a portable playback device 510 may be moved far enough away from an access point of the local network 560 that the playback device 510 loses its connection to the network 560. As another example, the playback device 510 may lack a network interface for communicating using 802.11-based protocols and may instead be configured to exclusively use other communication protocols, such as BLUETOOTH and/or BLE protocols. As yet another example, the playback device 510 may be associated with a different household than the controller 530, the other playback devices 502, and/or the other controllers 504 in the media playback system 500. For instance, the playback device 510 can be another user's portable device that is brought to the household where the media playback system 500 is located and that has not been connected to the local network 560.

In the configuration shown in FIG. 5B, the playback device 510 is connected to the local network 560, but the controller 530 is not. This configuration may arise, for instance, if the controller 530 is not configured for, or is not capable of, communicating with an access point of the local network 560. As an example, the controller 530 may be a mobile device, such as a smartphone or tablet, as described above. As such, the controller 530 may be moved far enough away from an access point of the local network 560 that the controller 530 loses its connection to the network 560. As another example, the controller 530 may lack a network interface for communicating using 802.11-based protocols and may instead be configured to exclusively use other communication protocols, such as BLUETOOTH and/or BLE protocols. As yet another example, the controller 530 may be associated with a different household than the playback device 510 and/or the other playback devices 502 and other controllers 504 in the media playback system 500. For instance, the controller 530 can be another user's mobile device that is brought to the household where the media playback system 500 is located and that has not been connected to the local network 560.

In either of the configurations shown in FIGS. 5A and 5B, the controller 530 and the playback device 510 can be configured to communicate with one another using off-LAN communications, such as by using communication protocols that are incompatible with communication protocols supported by the local network 560 of the media playback system 500. As shown, the controller 530 and the playback device 510 can be configured to communicate with one another using a first off-LAN communication link 570 and a second off-LAN communication link 580. The controller 530 and the playback device 510 can use the first off-LAN communication link 570 for streaming media from the controller 530 to the playback device 510 for playback. For instance, the first off-LAN communication link can include a BLUETOOTH connection. The controller 530 and the playback device 510 can use the second off-LAN communication link for performing various control operations, such as controlling playback of the media content streamed from the controller 530 to the playback device 510, obtaining operational status information of the playback device 510 and/or other playback devices in the media playback system 500, or any other control operations described herein. The second off-LAN communication link can include a BLE connection. Unless otherwise denoted, the use of the term "BLUETOOTH" herein refers to BLUETOOTH classic, also known as BLUETOOTH Basic Rate/Enhanced Data Rate (BR/EDR), and the term "BLE" refers to BLUETOOTH low energy (BLE). And while the examples described herein involve these particular communication protocols, examples using other communication protocols that are incompatible with the communication protocols of the local network 560 are contemplated herein as well.

Figure 6B:
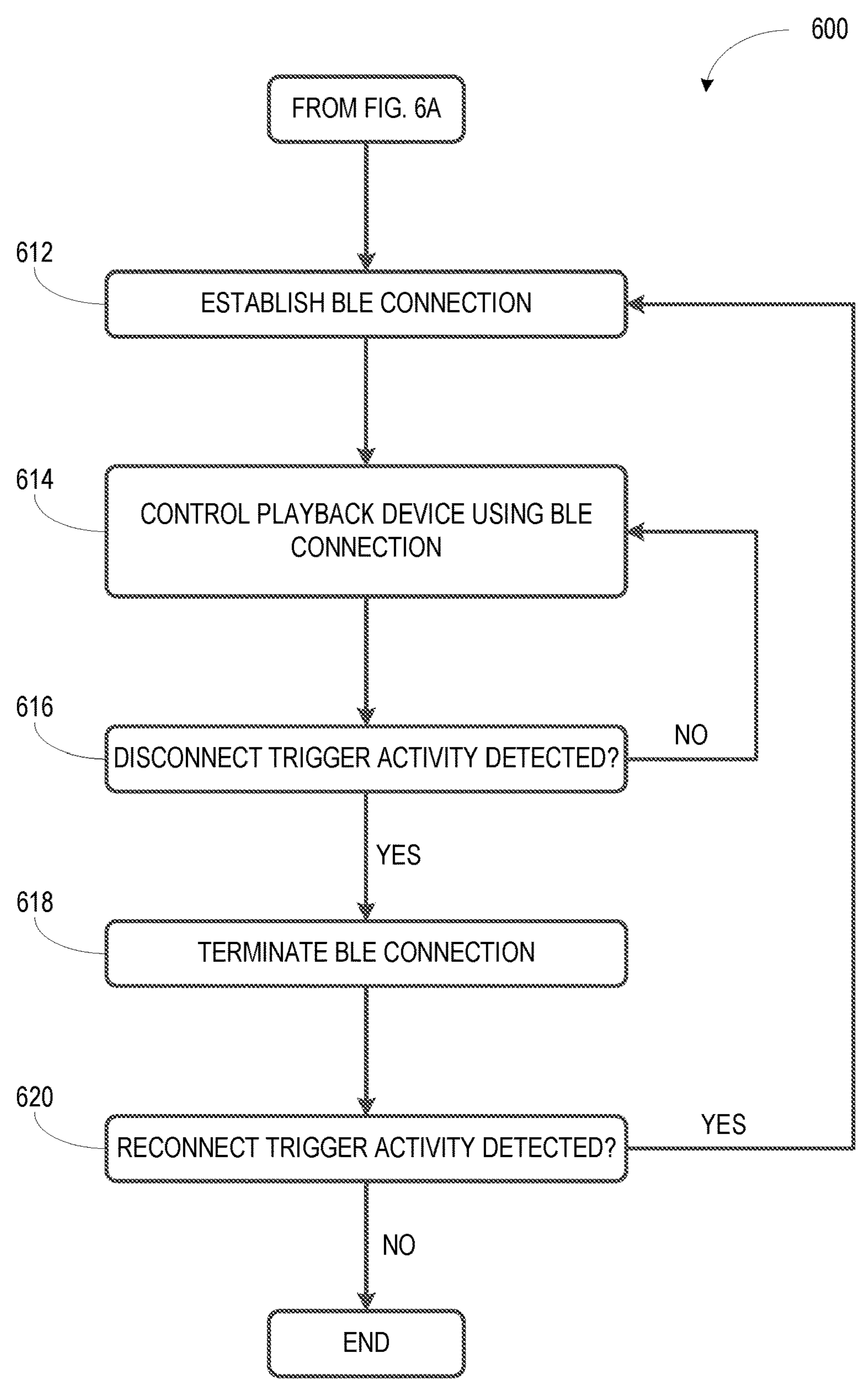
FIG. 6B is a portion of a flowchart showing example operations for providing off-LAN control of a playback device.

FIGS. 6A and 6B depict a flowchart 600 that illustrates an example process in which a controller uses off-LAN communications to control a playback device in a media playback system. The media playback system may be, for example, the media playback system 500 depicted in FIGS. 5A and 5B; the controller may be, for example, the controller 530 depicted in FIGS. 5A and 5B; and the playback device may be, for example, the playback device 510 depicted in FIGS. 5A and 5B.

Beginning at block 602, the controller 530 detects a triggering activity for initiating off-LAN communications for controlling the playback device 510. The triggering activity can involve some activity that indicates a likelihood that the controller 530 and/or the playback device 510 are not connected to the local network 560 of the media playback system 500 and, thus, that off-LAN control of the playback device 510 may be desirable.

In some examples, the triggering activity can involve the controller 530 detecting a change in one or more communication links of the controller 530. For instance, as noted above, the controller 530 can be configured to pair with the playback device 510 to establish the BLUETOOTH connection 570 for the purpose of streaming media content over the BLUETOOTH connection 570 from the controller 530 to the playback device 510 for playback. In these scenarios, the triggering activity can involve determining that the BLUETOOTH connection 570 has been established between the controller 530 and a playback device 510. As another example, the triggering activity can involve determining that the controller 530 is streaming media content over the BLUETOOTH connection 570 from the controller 530 to the playback device 510 for playback. These triggering activities may indicate a likelihood that the playback device 510 is not connected to the local network 560 of the media playback system 500 because, in line with the discussion above, the fact that the playback device 510 is configured to receive media content over the BLUETOOTH connection 570 may suggest that the playback device 510 is a portable device that is not connected to the local network 560.

In other examples, the triggering activity can involve determining that the controller 530 has disconnected from the local network 560 of the media playback system 500 or that the controller 530 has disconnected from Wi-Fi or some other 802.11-based communication link. This triggering activity may indicate a likelihood that the controller 530 is not connected to the local network 560 of the media playback system 500 because, as described above, the local network 560 can be configured to support communications using an 802.11-based protocol.

At block 604, the controller 530 identifies a target playback device for initiating off-LAN control. In examples where the triggering activity involves detecting the establishment or use of the BLUETOOTH connection 570, identifying the target playback device can involve identifying the playback device with which the BLUETOOTH connection 570 has been established as the target playback device. When establishing the BLUETOOTH connection 570 with the playback device 510, the controller 530 can receive a device identifier from the playback device 510, and the controller 530 can identify the target playback device as the playback device 510 associated with the received device identifier. In the present example, the target playback device is the playback device 510, but in other examples the target playback device can additionally or alternatively include one or more of the other playback devices 502 of the media playback system 500.

In some examples, the controller 530 can identify the target playback device as any or all of the playback devices currently or historically associated with the media playback system 500. When the controller 530 is connected to the local network 560 of the media playback system 500, the controller 530 can receive status information for each playback device in the media playback system 500. For instance, using the media playback protocol described above, the controller 530 can subscribe to a particular type of notification so that the controller 530 receives notification messages whenever a playback device joins the local network 560. The notification messages can include information identifying the playback devices, and the controller 530 can store this identifying information. The controller 530 can then use the stored identifying information to select one or more playback devices as the target device for off-LAN control.

At block 606, the controller 530 determines whether the target playback device 510 is accessible over the local network 560 of the media playback system 500. To make such a determination, the controller 530 can attempt to communicate with the target playback device 510 over the local network 560 of the media playback system 500 using a communication protocol supported by the local network 560. For example, the controller 530 can use an 802.11-based protocol to send a status request message to the playback device 510, such as in the form of a command message using the media playback protocol described above. If the controller 530 receives a successful reply message identifying the status of the playback device 510, then the controller 530 can determine that the playback device 510 is accessible over the local network 560 of the media playback system 500. However, if the controller 530 does not receive a successful reply message and/or receives an error message indicating a failure to deliver the message to the playback device 510, then the controller 530 can determine that the playback device 510 is not accessible over the local network 560 of the media playback system 500.

If the determination at block 606 is that the playback device 510 is accessible over the local network 560 of the media playback system 500, then the controller 530 can control the playback device 510 over the local network 560, such as by controlling the playback device 510 using an 802.11-based protocol supported by the local network 560. If, however, the determination at block 606 is that the playback device 510 is not accessible over the local network 560 of the media playback system 500, then the controller 530 can proceed to block 608 to continue setup of off-LAN control of the playback device 510.

At block 608, the controller 530 can determine whether the playback device 510 is accessible over BLE. The playback device 510 can be configured to broadcast a BLE beacon that includes information for identifying the playback device 510 and for establishing a BLE connection with the playback device 510. The controller 530 can attempt to detect a BLE beacon that corresponds to the target playback device 510. For instance, the controller 530 can detect any BLE beacons in its vicinity and compare the identifying information in the detected beacons with the target playback device identifying information determined at block 604. If the controller 530 finds a match, then the controller 530 can determine that the target playback device 510 is available for connecting over BLE and is thus accessible over BLE. Alternatively, if the controller 530 is unable to detect a BLE beacon that corresponds to the target playback device 510, then the controller 530 can determine that the playback device 510 is not accessible over BLE, and the process depicted in the flowchart 600 ends.

At block 610, the controller 530 can determine whether the playback device 510 is capable of engaging in control operations over BLE. Certain playback devices may be configured to receive and send control messages over BLE, while others may not. For instance, some playback devices can be loaded with program instructions that, when executed, cause the playback device to extract and process control messages according to the media playback protocol from both BLE communications and 802.11-based communications, while other playback devices may only do so for 802.11-based communications.

In some examples, the controller 530 can determine whether the playback device 510 is capable of engaging in control operations over BLE based on information received from the playback device 510 over the BLUETOOTH connection 570 or via the BLE beacon. For instance, as noted above, the playback device 510 can send information identifying the playback device 510 over the BLUETOOTH connection 570 or as part of the BLE beacon detected by the controller 530. Based on this identifying information, the controller 530 can determine a type or model of the playback device 510. And based on the type or model of the playback device 510, the controller 530 can determine whether the playback device 510 is capable of engaging in control operations over BLE, such as by referencing a lookup table that identifies which types or models of playback devices are capable of engaging in control operations over BLE. In other examples, the playback device 510 can directly provide such information to the controller 530, for instance, by indicating in the identifying information whether the playback device 510 is capable of engaging in control operations over BLE.

If the determination at block 610 is that the playback device 510 is not capable of engaging in control operations over BLE, then the process depicted in the flowchart 600 ends. In some examples, the controller 530 may still receive and display limited status information of playback devices that are neither accessible over the local network 560 nor available for a sustained BLE connection, such as by using techniques described in Provisional U.S. Patent Application No. 63/158,079 filed Mar. 8, 2021, and titled "Off-LAN Experience for Portables," which is incorporated herein by reference in its entirety. Thus, in some examples, if the playback device 510 is not capable of engaging in control operations over BLE, then the controller 530 may still receive and display limited status information about the playback device 510 without providing full control of the playback device 510 using such techniques. If, however, the determination at block 610 is that the playback device 510 is capable of engaging in control operations over BLE, then the controller 530 can proceed to block 612 to continue setup of off-LAN control of the playback device 510.

At block 612, the controller 530 establishes the BLE connection 580 with the playback device 510. The BLE beacon output by the playback device 510 can include an advertising packet for establishing the BLE connection 580. The controller 530 can receive the advertising packet and establish the BLE connection 580 with the playback device 510 according to the BLE protocol.

In some examples, the controller 530 and the playback device 510 can be configured to take measures to improve the security of the BLE connection 580. For instance, the controller 530 and the playback device 510 can be configured to encrypt control messages sent over the BLE connection 580. As an example, the controller 530 and the playback device 510 can be configured to use Datagram Transport Layer Security (DTLS) when sending messages over the BLE connection 580, but other encryption protocols can be used as well. In some examples, the playback device 510 can be configured to only allow BLE connections from specific authenticated controllers. For instance, the playback device 510 can be configured to only allow BLE connections from controllers that have already been approved for accessing the media playback system 500. Examples of how a controller can be approved for access to a media playback system are described in U.S. Patent Publication No. 2020-0314486 published Oct. 1, 2020, and titled "Access Control Techniques for Media Playback Systems," which is incorporated herein by reference in its entirety. Using any of the techniques disclosed therein, the playback device 510 can be configured to determine whether the controller 530 has been approved for access to the media playback system 500 and only allow the BLE connection 580 to be established if the controller 530 has been approved for access to the media playback system 500.

At block 614, once the controller 530 has established the BLE connection 580 with the playback device 510, the controller 530 can control the playback device 510 using the BLE connection 580. For example, the controller 530 can send BLE control messages to the playback device 510 over the BLE connection 580, for instance, in a payload portion of the BLE messages. The BLE control messages can include a command or a subscription request for subscribing to various notifications according to the media playback protocol described above. The playback device 510 can extract the command or subscription request from the BLE control message and process the command or subscription request according to the media playback protocol. In this manner, even when one or both of the controller 530 or the playback device 510 are not connected to the local network 560 of the media playback system 500, the controller 530 can still control the playback device 510 using the same media playback protocol that the controller 530 would otherwise use if connected to the playback device 510 over the local network 560.

The BLE control messages sent by the controller 530 can include instructions to perform any or all of the control operations described herein. For instance, the BLE control messages can include transport control commands (e.g., play, pause, or skip commands), volume control commands, equalization commands, or any other commands for modifying playback of media content. Additionally or alternatively, the BLE control messages can include requests for subscribing to notifications in connection with various operational parameters of the playback device 510 or the other playback devices 502, such as notifications for identifying changes to current playback statuses, current volume settings, album art of currently playing media content, metadata of currently playing media content, current equalization settings, temperature status, telemetry or diagnostic information, battery status, charger or power adapter compatibility information, information identifying any currently connected controller that is streaming media content to a playback device, or information identifying whether BLUETOOTH content is being streamed to a playback device.

The playback device 510 can also send BLE control messages to the controller 530. For instance, as described above, control operations carried out using the media playback protocol described above may be formatted as commands having a request-reply message pattern. As such, after receiving and processing a BLE message containing a request from the controller 530, the playback device 510 can reply with a BLE message indicating whether the command was successfully processed and/or any information requested by the command, such as operational status information of the playback device 510. Additionally or alternatively, the playback device 510 can send notification messages to the controller 530 over the BLE connection 580 in accordance with the media playback protocol when data objects associated with a subscribed notification change states.

In some examples, the controller 530 can use BLE control messages for controlling the playback device 510, and the controller 530 can use 802.11-based control messages for controlling the other playback devices 502 in the media playback system 500. For instance, in the media playback system configuration depicted in FIG. 5A, the playback device 510 is not connected to the local network 560 of the media playback system 500, but the controller 530 is connected to the local network 560. As such, the controller 530 can send BLE control messages to the playback device 510 over the BLE communication link 580, and the controller 530 can send 802.11-based control messages to the other playback devices 502 over the local network 560.

In other examples, the controller 530 can use BLE control messages for controlling both the playback device 510 and the other playback devices 502 in the media playback system 500. For instance, in the media playback system configuration depicted in FIG. 5B, the controller 530 is not connected to the local network 560 of the media playback system 500, but the playback device 510 is connected to the local network 560. As such, in addition to sending BLE control messages to the playback device 510 to control the playback device 510 itself, the controller 530 can also send BLE control messages to the playback device 510 over the BLE communication link 580 for controlling the other playback devices 502 connected to the playback device 510 over the local network 560. For instance, the controller 530 can send a BLE control message to the playback device 510, and the BLE control message can include information specifying one of the other playback devices 502 as the target recipient of the control message. Based on the target recipient information, the playback device 510 can route the command to the specified one of the other playback devices 502 over the local network 560.

Similarly, the controller 530 can receive BLE control messages from the playback device 510 or the other playback devices 502 as well. For instance, using the media playback protocol described above, the playback device 510 can respond to BLE control messages from the controller 530 with BLE reply messages indicating whether the request was successfully carried out and/or providing any information requested in the BLE control messages. In examples where the controller 530 is also controlling the other playback device 502 using BLE control messages, the other playback devices 502 can send reply messages over the local network 560 to the playback device 510, and the playback device 510 can send the reply messages to the controller 530 in the payload portion of a BLE message.

At block 616, the controller 530 can determine whether a disconnect trigger activity has been detected. The disconnect trigger activity can be some activity that indicates that the controller 530 no longer needs to maintain the BLE connection with the playback device 510. This can be useful in scenarios where multiple controllers can control the playback device, as the playback device 510 may support a limited number of available BLE connections. For instance, the playback device 510 may only support a single BLE connection at any given time, such that none of the other controllers 504 can control the playback device over BLE until the BLE connection between the controller 530 and the playback device 510 is terminated.

In some example implementations, the disconnect trigger activity can involve a threshold amount of inactivity. For instance, the controller 530 or the playback device 510 can determine that the controller 530 has not sent or received a BLE control message for at least a predetermined amount of time (e.g., 10 seconds), and, based on that determination, the controller 530 or the playback device 510 can determine that the disconnect trigger activity has occurred. In other example implementations, the disconnect trigger activity can involve a user exiting the controller application software, or setting the controller application software as a background process, on the controller 530. Other example disconnect trigger activities are possible as well. And in other example implementations, the disconnect trigger activity can involve determining that the controller 530 and the playback device 510 are both connected to the local network 560 of the media playback system 500. If the controller 530 and the playback device 510 are both connected to the local network 560, then the controller 530 can be configured to preferentially control the playback device 510 over the local network 560, which may render the BLE connection 580 superfluous.

If no disconnect trigger activity is detected, then the controller 530 continues to maintain the BLE connection with the playback device 510 and can continue to control the playback device 510 and/or the other playback devices 502. If the disconnect trigger activity is detected, however, then the controller can proceed to block 618 of the flowchart 600.

At block 618, based on detecting the disconnect trigger activity, the controller 530 or the playback device 510 can terminate the BLE connection 580. For example, if the controller 530 detects the disconnect trigger activity, then the controller 530 can terminate the BLE connection 580 by sending a disconnect BLE message to the playback device 510. If the playback device 510 detects the disconnect trigger activity, then the playback device 510 can terminate the BLE connection 580 by sending a disconnect BLE message to the controller 530.

Further, in some example implementations, based on detecting the disconnect trigger activity and before terminating the BLE connection 580, the controller 530 can unsubscribe from any notifications associated with the playback device 510 or the other playback devices 502. In line with the discussion above, when the controller 530 is subscribed to notifications for a playback device, the playback device can notify the controller 530 when a data object associated with the playback device changes states. Terminating the BLE connection 580 can prevent the controller 530 from receiving such notifications, so it may be useful for the controller 530 to first unsubscribe from the notifications before terminating the BLE connection 580 so that the other playback devices 502 in the media playback system 500 do not congest the local network 560 with futile attempts to transmit the notifications to the controller 530.

At block 620, the controller 530 can determine whether a reconnect trigger activity has been detected. The reconnect trigger activity can be some activity that indicates that the controller 530 needs to reestablish the BLE connection with the playback device 510. In some example implementations, the reconnect trigger activity can involve user interaction with the controller application on the controller 530. For instance, the controller 530 can determine that a user has opened the controller application, moved the application from a background process to a foreground process, or provided some user input via the controller application for modifying playback of the playback device 510 or one of the other playback devices 502, and, based on that determination, the controller 530 can determine that the reconnect trigger activity has occurred.

If the controller 530 detects the reconnect trigger activity, then the controller 530 returns to block 612 to establish the BLE connection 580 between the controller 530 and the playback device 510. The controller 530 can then continue to proceed through the process depicted by the flowchart 600. If, however, the controller 530 does not detect the reconnect trigger activity, then the process ends.

While it may be useful to use the techniques described herein to control a playback device of a media playback system over a BLE connection when the playback device or its controller are disconnected from a local network of the media playback system, doing so has some notable shortcomings. For instance, BLE connections allow for significantly lower data throughput than 802.11-based connections. This may present an issue if the controller 530 attempts to send multiple commands over a short period of time.

To illustrate, consider an example in which a user provides input to the controller 530 that includes a slider input, such as by moving a volume slider or an equalization slider. The slider input can represent a series of discrete inputs corresponding to the distance of the movement of the slider. For instance, moving a volume slider from a value of 10 to a value of 50 can represent 40 discrete user inputs (one input for each discrete change in volume level). Based on these inputs, the controller 530 can generate corresponding commands, such as one command per input. As such, certain user inputs, like moving a slider, can cause the controller 530 to generate a large number of commands over a short period of time. The controller 530 can be configured to queue the commands for transmission over the BLE connection 580. And as the controller 530 adds more commands to the queue, the amount of time needed to transmit the queued commands to the playback device 510 increases. Due to the lower data throughput of the BLE connection 580, it may take the controller 530 several seconds to transmit a large queue of commands corresponding to a movement of a slider input. This can result in noticeable delays between the time of the user input and the time of the corresponding effect of the user input, which can provide a poor user experience.

Figure 7:
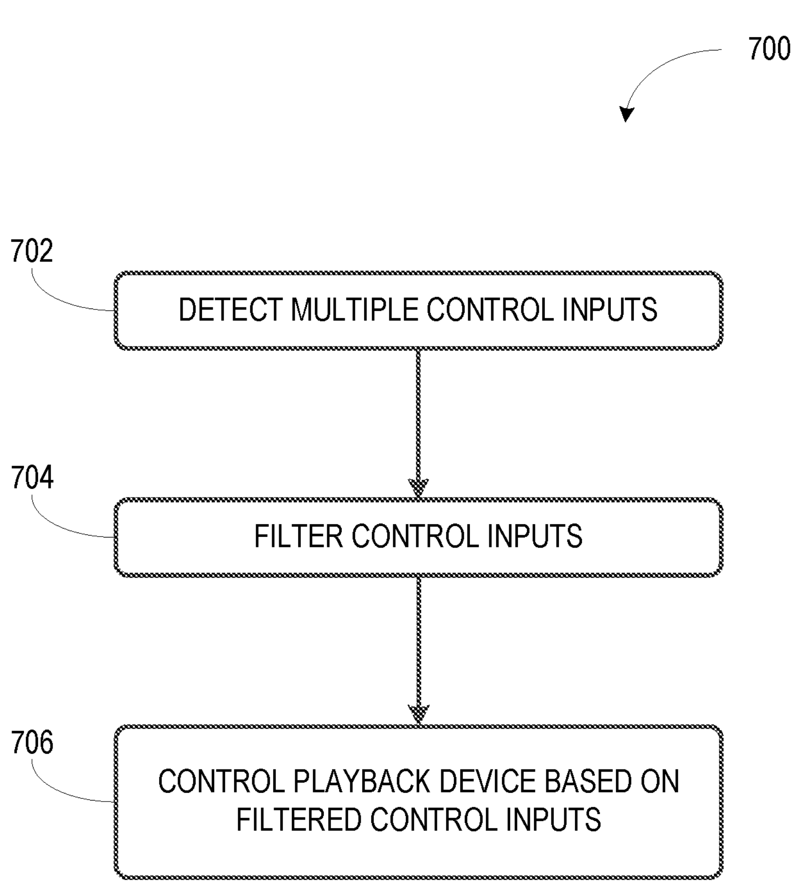
FIG. 7 is a flowchart showing example operations for providing off-LAN control of a playback device.

In order to help address these issues, the controller 530 can be configured to filter and/or prioritize certain control inputs received by the controller 530. FIG. 7 depicts a flowchart 700 that illustrates an example process in which the controller 530 filters and/or prioritizes control inputs. The process depicted in FIG. 7 can be carried out, for example, while the controller 530 is controlling the playback device 510 using the BLE connection 580 at block 614 in the process depicted by flowchart 600 in FIG. 6.

Beginning at block 702, the controller 530 detects multiple control inputs received by the controller 530. In line with the discussion above, the multiple control inputs can include a series of inputs corresponding to a movement of a slider, such as a volume slider or an equalization slider. However, the multiple inputs can take other forms as well. When receiving control inputs, the controller 530 can organize the inputs into a queue, such as a first-in, first-out (FIFO) queue.

At block 704, the controller 530 filters the multiple control inputs. By filtering the inputs, the controller 530 can disregard certain inputs by removing them from the queue, thereby reducing the number of inputs in the queue and reducing the amount of time that each queued input spends in the queue.

The controller 530 can filter the control inputs in various ways. In some example implementations, the controller 530 can disregard one or more control inputs for controlling a given parameter of the playback device 510 or the other playback devices 502 that have been superseded by a subsequent control input. For instance, in the example above involving movement of a volume slider, the controller 530 can identify and process the control input that corresponds to the ultimate volume value selected by the user (i.e., the volume value corresponding to the position of the slider once the user has stopped moving the slider), and the controller 530 can disregard any preceding control inputs that correspond to previous movements of the volume slider. To facilitate this, the controller 530 can be configured to identify any control inputs in the input queue that correspond to the same parameter and discard all but the most recently added control input.

Alternatively, the controller 530 can be configured to discard only a portion of the control inputs that correspond to the same parameter. For instance, the controller 530 can discard half of the control inputs that correspond to the same parameter, and the controller 530 can discard the inputs in an intermittent pattern (e.g., alternating between discarding and keeping consecutive inputs). Filtering the inputs in such an intermittent pattern can provide the user with a gradual parameter change, such as a gradual volume increase or decrease, that a user may expect when interacting with a slider input.

In other example implementations, the controller 530 can be configured to process slider inputs differently when controlling the playback device 510 over BLE connection 580. For instance, instead of generating a separate command for each discrete movement of the slider as the controller 530 can be configured to do when using 802.11-based communications, the controller 530 can be configured to only generate a single command corresponding to the position of the slider once the user stops moving and releases the slider input. Alternatively, the controller 530 can be configured to generate commands based on slider inputs at a lower rate. Instead of generating a command for each discrete movement of the slider, the controller 530 can be configured to generate commands at a predetermined sampling rate. For instance, the controller 530 can be configured to, upon detecting movement of a slider input, sample the slider input value at the predetermined sampling rate, such as once every 200 milliseconds, and generate a separate command for each sampled input value. In some examples, the sampling rate can be selected based on a data rate of the BLE connection 580. For instance, the sampling rate can be selected to match the amount of time it takes the controller 530 to generate and send a single command to the playback device 510 over the BLE connection 580. Other examples are possible as well.

At block 706, the controller 530 controls the playback device 510 based on the filtered control inputs. Once the controller 530 has filtered the control inputs, such as by discarding control inputs for the same parameter or limiting the number of commands generated from a particular user input, the controller 530 can transmit any remaining commands to the playback device 510 over the BLE connection 580.

Figure 8:
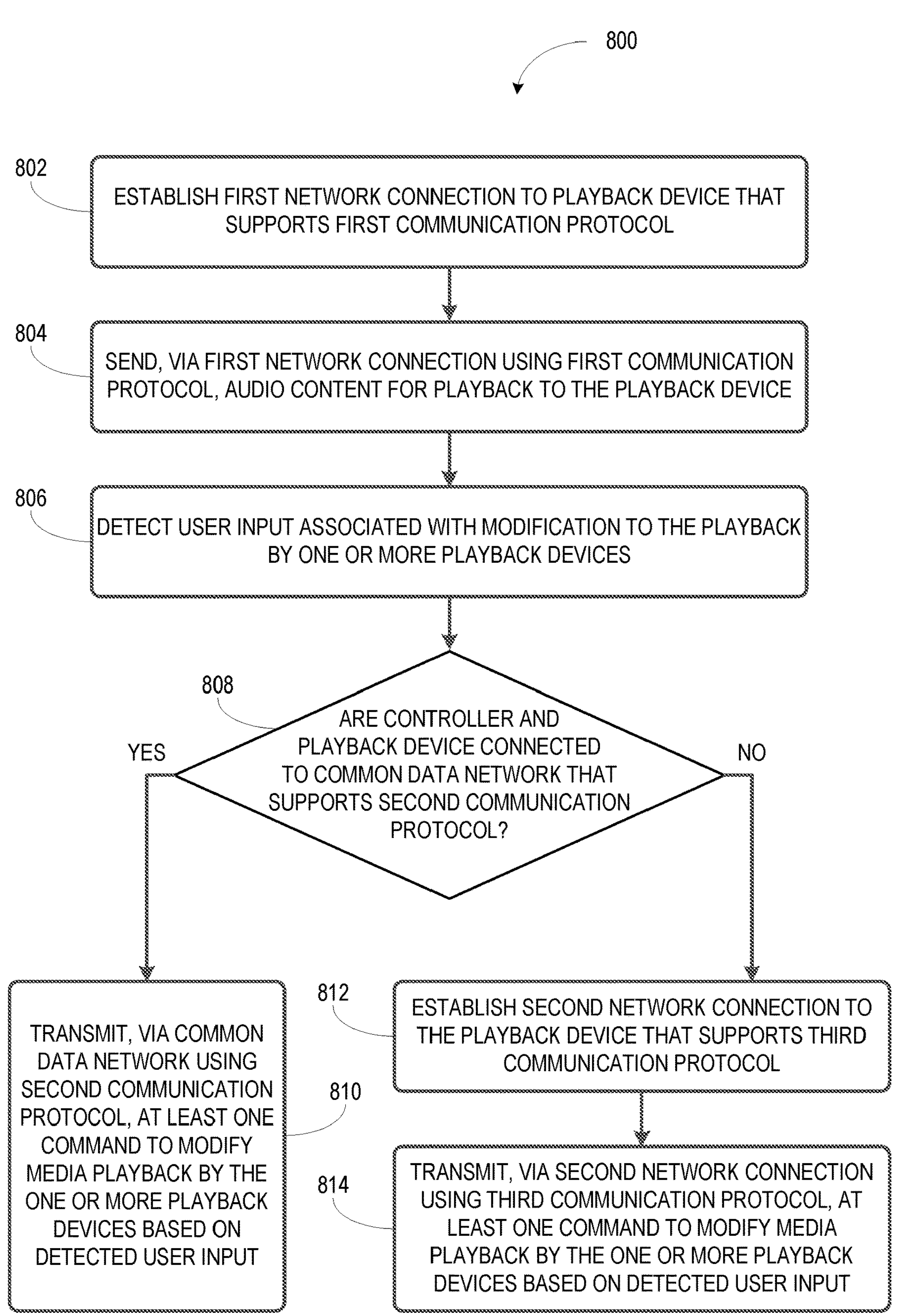
FIG. 8 is a flowchart showing example operations for providing off-LAN control of a playback device.

FIG. 8 depicts a flowchart 800 that illustrates an example process in which a controller uses off-LAN communications to control media playback by one or more playback devices in a media playback system. The media playback system may be, for example, the media playback system 500 depicted in FIGS. 5A and 5B; the controller may be, for example, the controller 530 depicted in FIGS. 5A and 5B; and the one or more playback devices may be, for example, the playback device 510 or the other playback devices 502 depicted in FIGS. 5A and 5B. The controller includes at least one communication interface configured to facilitate communication using a first communication protocol, a second communication protocol that is different from the first communication protocol, and a third communication protocol that is different from the first and second communication protocols.

Beginning at block 802, the controller establishes a first network connection to a playback device that supports the first communication protocol. In line with the discussion above, the first network connection can include a BLUETOOTH connection, and the first communication protocol can include the BLUETOOTH protocol.

At block 804, the controller sends, via the first network connection using the first communication protocol, audio content for playback to the playback device. In some examples, the controller sends the audio content to the playback device for playback by the playback device. In other examples, the controller sends the audio content to the playback device for playback by one or more other playback devices coupled to the playback device.

At block 806, the controller detects, via a user interface of the controller, user input associated with a modification to the playback by one or more playback devices. In line with the discussion above, the user input can include any one of various types of control inputs, such as transport control inputs (e.g., pause, play, skip), volume control inputs, equalization control inputs, or any other inputs for controlling the playback of the audio content. The modification to the playback can include a modification to the playback by the playback device that receives the audio content from the controller via the first network connection using the first communication protocol, and/or the modification to the playback can include a modification to the playback by one or more other playback devices coupled to the playback device.

At block 808, the process depicted by the flowchart 800 diverges depending on whether the controller and the playback device are connected to a common data network that supports the second communication protocol. In line with the discussion above, the common data network that supports the second communication protocol can take the form of an 802.11-based network, such as a WLAN. In some examples, the controller can determine whether the controller and the playback device are connected to the common data network that supports the second communication protocol. If the controller and the playback device are connected to the common data network that supports the second communication protocol, then the process advances to block 810. If, however, one or both of the controller or the playback device are not connected to the common data network that supports the second communication protocol, then the process advances to block 812.

At block 810, while the controller and the playback device are connected to the common data network that supports the second communication protocol, the controller can transmit, via the common data network using the second communication protocol, at least one command to modify media playback by the one or more playback devices based on the detected user input. In line with the discussion above, this can involve modifying the media playback by sending control messages over the 802.11-based network of the media playback system in accordance with a media playback protocol supported by the media playback system.

At block 812, while at least one of the controller or the playback device are not connected to the common data network that supports the second communication protocol, the controller can establish a second network connection to the playback device that supports the third communication protocol. In line with the discussion above, the second network connection can include a BLE connection, and the third communication protocol can include the BLE protocol.

At block 814, also while at least one of the controller or the playback device are not connected to the common data network that supports the second communication protocol, the controller can transmit, via the second network connection using the third communication protocol, at least one command to modify media playback by the one or more playback devices based on the detected user input. In line with the discussion above, this can involve modifying the media playback by sending control messages over the BLE connection in accordance with a media playback protocol supported by the media playback system.

In some examples, the process depicted by the flowchart 800 can further involve, while at least one of the controller or the playback device are not connected to the common data network that supports the second communication protocol, the controller receiving, via the second network connection using the third communication protocol, information identifying an operational status of the playback device. Further, in some examples, the controller can receive the information identifying the operational status of the playback device based on having subscribed to one or more notifications associated with the playback device in accordance with the media playback protocol described above. For instance, the controller can transmit, via the second network connection using the third communication protocol, a subscription request for a particular operational parameter of the playback device. And based on the subscription request, the controller can receive, via the second network connection using the third communication protocol, information corresponding to the particular operational parameter after the particular operational parameter changes.

In some examples, establishing the second network connection to the playback device that supports the third communication protocol can involve the controller establishing the second network connection to the playback device that supports the third communication protocol based on having established the first network connection to the playback device that supports the first communication protocol. Examples of this are described above in connection with FIG. 6 in which the controller can be configured to establish the BLE connection with the playback device based on having already established the BLUETOOTH connection with the playback device and using the established BLUETOOTH connection as a basis for selecting the playback device as the target device for the BLE connection.

In some examples, the process depicted by the flowchart 800 can further involve the controller terminating the first network connection to the playback device that supports the first communication protocol. And based on terminating the first network connection to the playback device, the controller can terminate the second network connection to the playback device that supports the third communication protocol. Examples of this are described above in connection with FIG. 6 in which the controller can terminate the BLUETOOTH connection with the playback device and, based on the termination of the BLUETOOTH connection, also terminate the BLE connection with the playback device.

In some examples, the process depicted by the flowchart 800 can further involve, after having established the second network connection to the playback device that supports the third communication protocol, the controller determining that the computing device and the playback device are connected to the common data network that supports the second communication protocol. And based on the determination that the computing device and the playback device are connected to the common data network that supports the second communication protocol, the controller can terminate the second network connection to the playback device that supports the third communication protocol. Examples of this are described above in connection with FIG. 6 in which the controller can determine that both the controller and the playback device are connected to the 802.11-based network of the media playback system and, based on this determination, terminate the BLE connection with the playback device in order to control the playback device over the 802.11-based network.

In some examples, the process depicted by the flowchart 800 can further involve, while the playback device and the one or more other playback devices are connected to the common data network that supports the second communication protocol, and while the computing device is not connected to the common data network that supports the second communication protocol, the controller receiving, via the second network connection using the third communication protocol, information identifying (i) the one or more other playback devices and (ii) an operational status of the one or more other playback devices. Examples of this are described above in connection with FIGS. 5B and 6A-6B in which the controller can receive notification messages and/or replies to command messages from the other playback devices in the media playback system. The other playback devices can send the messages over the 802.11-based network of the media playback system to the particular playback device that is connected to the controller via the BLE connection, and that particular playback device can send the messages to the controller over the BLE connection.

In some examples, detecting, via the at least one user interface, user input associated with the modification to the playback by the one or more playback devices can involve the controller detecting user input associated with multiple modifications including user input associated with a first modification and a subsequent second modification to the playback by the one or more playback devices. In these examples, the process depicted by the flowchart 800 can further involve the controller determining that the first and second modifications are for modifying a same playback parameter of the one or more playback devices. Based on (i) the determination that the first and second modifications are for modifying the same playback parameter of the one or more playback devices and (ii) the second modification being subsequent to the first modification, the controller can refrain from transmitting, via the second network connection using the third communication protocol, a command corresponding to the first modification to the playback by the one or more playback devices. Examples of this are described above in connection with FIG. 7 in which the controller is configured to filter out various detected user inputs in order to reduce congestion of the BLE connection.

When carrying out any of the operations described above in connection with FIGS. 6A, 6B, 7, and 8, the controller and playback devices may employ one or more encryption techniques to maintain secure communications with one another.

Figure 9:
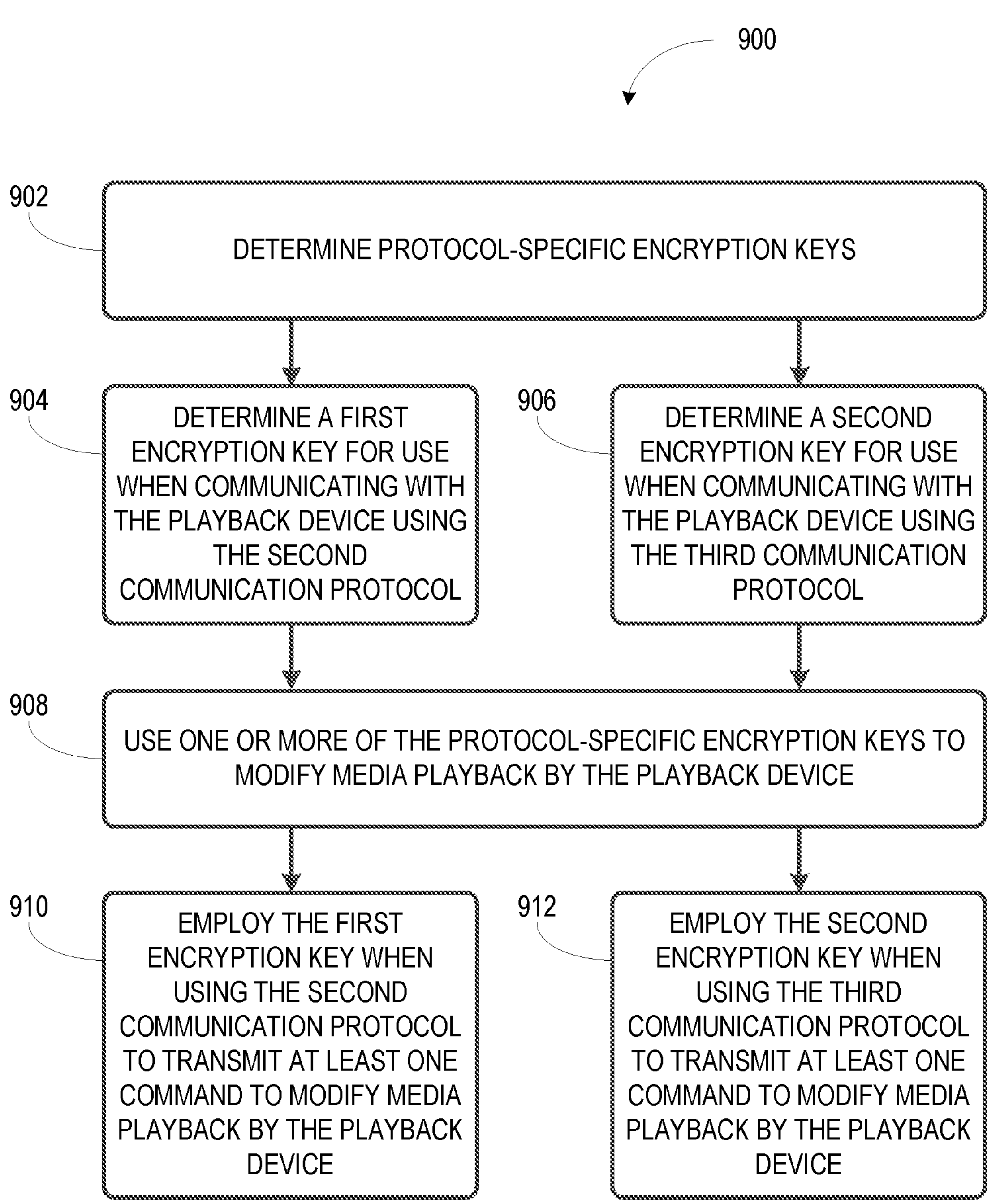
FIG. 9 is a flowchart showing example operations for employing encryption techniques when providing off-LAN control of a playback device.

FIG. 9 depicts a flowchart 900 that illustrates an example process in which a controller and one or more playback devices in a media playback system employ encryption techniques in connection with off-LAN communications for controlling media playback by the one or more playback devices. The media playback system may be, for example, the media playback system 500 depicted in FIGS. 5A and 5B; the controller may be, for example, the controller 530 depicted in FIGS. 5A and 5B; and the one or more playback devices may be, for example, the playback device 510 or the other playback devices 502 depicted in FIGS. 5A and 5B. The controller includes at least one communication interface configured to facilitate communication using a first communication protocol, a second communication protocol that is different from the first communication protocol, and a third communication protocol that is different from the first and second communication protocols. In line with the discussion above, the first communication protocol can include the BLUETOOTH protocol used for communicating over a BLUETOOTH connection, the second communication protocol can include a media playback protocol supported by the media playback system for sending control messages over an 802.11-based network of the media playback system, and the third communication protocol can include the BLE protocol used for communicating over a BLE connection.

Beginning at block 902, the controller determines one or more protocol-specific encryption keys for use when communicating with the playback devices of the media playback system using different communication protocols. The protocol-specific encryption keys may take various forms and can include encryption keys configured for use in connection with any now-known or later-developed encryption techniques supported by the network connections established between the controller and the playback devices. For example, any or all of the protocol-specific encryption keys can include DTLS encryption keys for network connections that support the User Datagram Protocol (UDP) transport layer protocol, and/or any or all of the protocol-specific encryption keys can include TLS encryption keys for network connections that support the Transmission Control Protocol (TCP) transport layer protocol. Other examples are contemplated herein as well.

As shown at block 904, determining the one or more protocol-specific encryption keys involves determining a first encryption key for use when communicating with the playback devices using the second communication protocol. This may involve determining a first public key of the media playback system, which can be a public key configured specifically for use with communications sent using the second communication protocol over the 802.11-based network of the media playback system.

In some examples, the media playback system generates the first encryption key as part of an initial setup process. For instance, when a playback device is first added to the media playback system, the playback device may query one or more other playback devices in the media system for the first encryption key. If there are no other playback devices in the media playback system (e.g., if the playback device is the first playback device to be added to the media playback system), then the playback device may generate the first encryption key and propagate the first encryption key to any other playback devices that are subsequently added to the media playback system.

The controller can then obtain the first encryption key from the media playback system. For instance, the controller can query the playback device for the first encryption key, and the playback device can respond with the first encryption key. In some examples, this query and response is part of an encryption handshake for setting up a communication session over the 802.11-based network of the media playback system. But in other examples, the playback device can send the first encryption key to the controller using any other communication link between the controller and the playback device.

As shown at block 906, determining the one or more protocol-specific encryption keys further involves determining a second encryption key for use when communicating with the playback devices using the third communication protocol. This may involve determining a second public key of the media playback system, which can be a public key configured specifically for use with communications sent using the third communication protocol (e.g., communications sent over a BLE connection using the BLE protocol).

In some examples, the media playback system generates the second encryption key as part of an initial setup process, which may be done in a similar manner as generating the first encryption key, as described above. In other examples, the media playback system generates the second encryption key on demand. For instance, a given playback device of the media playback system can generate the second encryption key in response to a trigger event, such as in response to a request from the controller to initiate a communication session with the playback device using the third communication protocol (e.g., the BLE protocol) or in response to setting up a communication session between the controller and the playback device using the first communication protocol (e.g., the BLUETOOTH protocol).

The controller can then obtain the second encryption key from the media playback system. For instance, the controller can query the playback device for the second encryption key, and the playback device can respond with the second encryption key. In some examples, this query and response is part of an encryption handshake for setting up a communication session using the third communication protocol, such as when establishing a BLE connection between the controller and the playback device. But in other examples, the playback device can send the second encryption key to the controller using any other communication link between the controller and the playback device, such as by sending the second encryption key to the controller over the 802.11-based network of the media playback system.

The controller may store one or both of the first or second encryption keys in a data storage of the controller and may access the stored encryption keys when engaging in communications with the playback device. In some examples, in order to provide improved security, the media playback system may occasionally update one or both of the first or second encryption keys. As such, the controller may likewise occasionally query the media playback system for updated key values, and/or the media playback system may push updated key values to the controller during an active communication session.

At block 908, the controller uses one or more of the protocol-specific encryption keys to modify media playback by the playback device, and the controller may do so in response to detecting a user input for modifying the playback, such as described above at block 806 of FIG. 8. The particular protocol-specific encryption key that the controller uses at block 908 may depend on the protocol that the controller is using to modify the media playback. For instance, as described above in connection with FIG. 8, when the controller and the playback device are both connected to a common data network that supports the second communication protocol, the controller transmits a playback modification command to the playback device over the common data network using the second communication protocol. In such a scenario, the controller employs the first encryption key when using the second communication protocol to transmit the playback modification command to the playback device, as shown at block 910. On the other hand, when one or both of the controller or the playback device are not connected to the common data network, the controller establishes a different network connection that supports the third communication protocol with the playback device and transmits the playback modification command to the playback device using the third communication protocol. In such a scenario, the controller employs the second encryption key when using the third communication protocol to transmit the playback modification command to the playback device, as shown at block 912.

When employing either or both of the first or second encryption keys to transmit commands to the playback device, the controller may use any encryption techniques now known or later developed. As one example, the controller and the playback device may execute a Diffie-Hellman key exchange technique in which the controller and the playback device use respective private keys to generate a first shared secret key from the first encryption key or a second shared secret key from the second encryption key. The controller and the playback device can then employ the first shared secret key to engage in encrypted communications using the second communication protocol, or the second shared secret key to engage in encrypted communications using the third communication protocol. Other applicable encryption techniques are contemplated herein as well.

FIGS. 6A, 6B, 7, 8, and 9 include one or more operations, functions, or actions as illustrated by one or more of operational blocks. Although the blocks are illustrated in a given order, some of the blocks may also be performed in parallel, and/or in a different order than those described herein. Also, the various blocks may be combined into fewer blocks, divided into additional blocks, and/or removed based upon the desired implementation.

In addition, for the flowcharts shown in FIGS. 6A, 6B, 7, 8, and 9 and other processes and methods disclosed herein, the diagrams show functionality and operation of one possible implementation of present embodiments. In this regard, each block may represent a module, a segment, or a portion of program code, which includes one or more instructions executable by one or more processors for implementing logical functions or blocks in the process.

The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the processes and methods disclosed herein, each block in FIGS. 6A, 6B, 7, 8, and 9 may represent circuitry and/or machinery that is wired or arranged to perform the specific functions in the process.

Using the protocol-specific encryption techniques described herein, a controller can be configured to employ one of two different available encryption keys depending on whether the controller is engaging in on-LAN or off-LAN communications with a media playback system. Further, in some examples, more than two encryption keys can be available for use by the controller, such as when the controller is configured to interface with more than one media playback system. For instance, in line with the discussion above, a given media playback system can propagate its protocol-specific encryption keys to each device in the media playback system, such that a given media playback system has two protocol-specific encryption keys (e.g., a first encryption key for on-LAN communications using an 802.11-based protocol and a second encryption key for off-LAN communications using a BLE protocol). But each media playback system can have its own distinct set of protocol-specific encryption keys, such that a controller that interfaces with two different media playback systems (e.g., a first media playback system in the user's household and a second media playback system in a friend's household) can be configured to employ a first set of protocol-specific encryption keys when engaging in on-LAN and/or off-LAN communications with the first media playback system and a second set of protocol-specific encryption keys when engaging in on-LAN and/or off-LAN communications with the second media playback system. In order to help the controller employ the appropriate encryption key when attempting to communicate with a given media playback system, the controller can be configured to maintain a data structure that identifies both the set of encryption keys available for use by the controller and the media playback systems and their respective playback devices with which each encryption key is to be employed.

Figure 10:
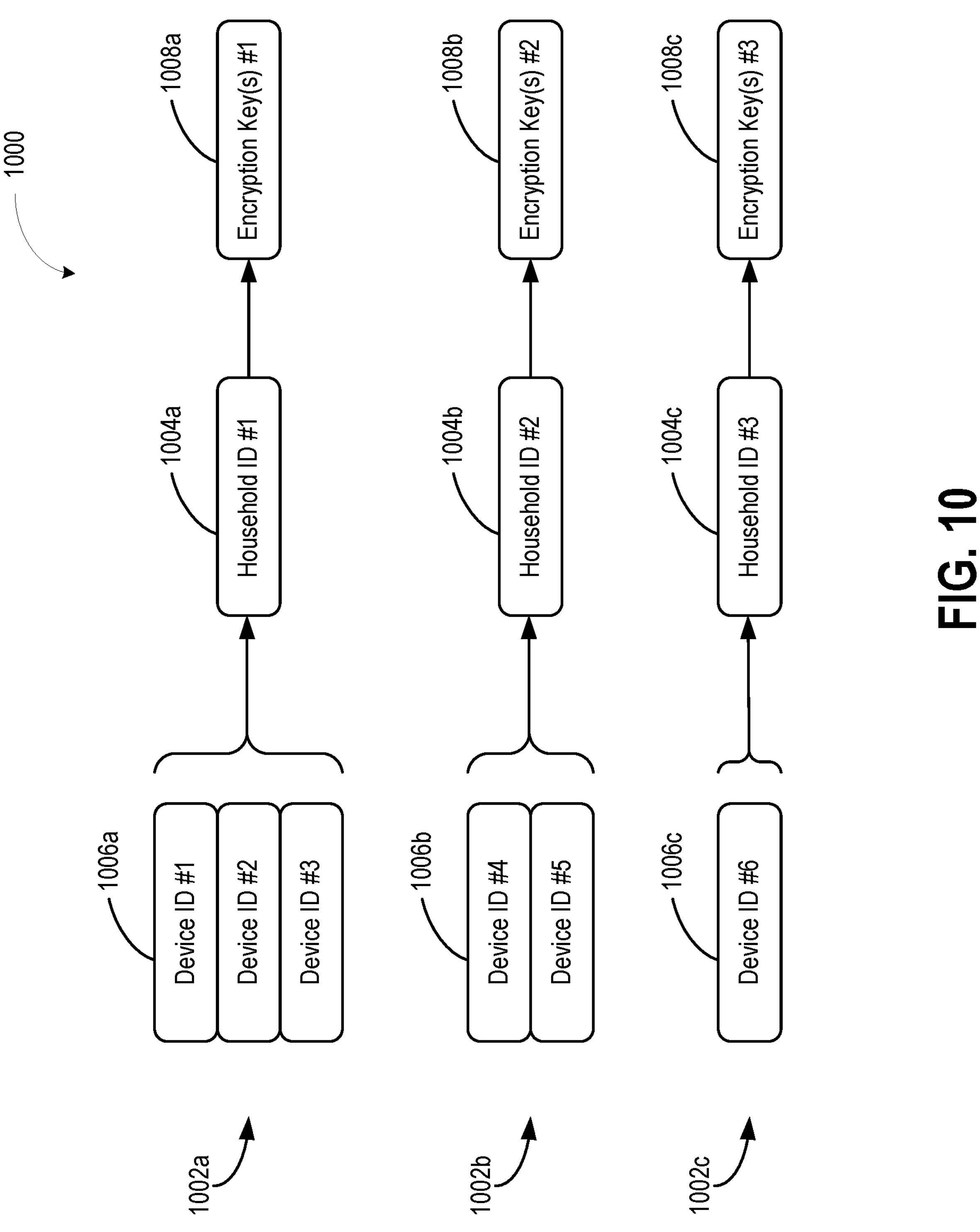
FIG. 10 is a block diagram of an example data structure for associating encryption keys with devices in media playback systems.

FIG. 10 depicts a block diagram of an example data structure 1000 that may be stored and maintained in a data storage of a controller for use by the controller when employing the protocol-specific encryption techniques described herein. As shown, the data structure 1000 can be organized into multiple different substructures 1002, each of which can correspond to a different media playback system. In the present example, the data structure 1000 includes a first substructure 1002*a* corresponding to a first media playback system, a second substructure 1002_b_ corresponding to a second media playback system, and a third substructure 1002_c_ corresponding to a third media playback system, but other examples can include additional or fewer substructures 1002 corresponding to additional or fewer media playback systems.

When the controller first connects to a playback device in a media playback system, such as when connecting to the playback device using on-LAN communications over a common data network of the media playback system, the controller receives an identifier of the media playback system from the playback device. This identifier can take the form of a household identifier (HHID), which can take various forms such as a distinct alphanumeric character string. Additionally, the controller receives from the playback device, a device identifier of the playback device, which can also take various forms such as a distinct alphanumeric character string (e.g., a full or partial serial number). The controller can also receive from the playback device the device identifiers of some or all of the other playback devices in the media playback system.

Upon receiving such information, the controller can update the data structure to include data representing this information. For instance, when the controller connects to a first media playback system, the controller can receive information identifying the system's HHID as "Household ID #1" and identifying the playback devices in the system as having device identifiers "Device ID #1," "Device ID #2," and "Device ID #3." As shown in FIG. 10, the controller can then store data representing these device identifiers 1006_a_ in association with data representing the HHID 1004_a_ in substructure 1002_a_. The controller can similarly receive and store data representing associated HHIDs and device identifiers for each media playback system the controller connects to, as represented in FIG. 10 by HHID 1004_b_ and device IDs 1006_b_ in substructure 1002_b_ and by HHID 1004_c_ and device ID 1006_c_ in substructure 1002_c_.

Further, in line with the discussion above, the controller can also receive protocol-specific encryption key information from the playback device. For instance, when connecting to the playback device using on-LAN communications over the common data network of the media playback system, the controller can receive a first encryption key for use when communicating over the common data network. In some examples, even when the controller is communicating using on-LAN communications, the playback device may additionally send a second encryption key for use with off-LAN communications, such as those using the BLE protocol as described above. However, in other examples, the playback device may defer from sending the second off-LAN encryption key until the controller attempts to connect to the playback device using off-LAN communications.

The controller can then update the data structure 1000 to include data representing the received encryption key information, and the controller may store the data representing the encryption key information in association with the corresponding substructure of the media playback system. For instance, as shown in FIG. 10, the controller can store data representing on-LAN and/or off-LAN encryption keys for a first media playback system in substructure 1002_a_ in association with HHID 1004_a_ and device identifiers 1006_a_, as represented by encryption key data 1008_a_. The controller can similarly receive and store data representing encryption key information for each media playback system the controller connects to, as represented in FIG. 10 by encryption key data 1008_b_ in substructure 1002_b_ and by encryption key data 1008_c_ in substructure 1002_c_.

When connecting to a playback device of a media playback system, the controller can then access the data structure 1000 to determine the appropriate encryption key to employ in order to establish a secure connection with the playback device. This can be particularly advantageous when attempting to establish a secure connection with the playback device using off-LAN communications involving more than one communication protocol, such as the scenarios described herein where the controller is streaming media to the playback device over a BLUETOOTH connection while using a BLE connection to control the playback of the streamed media.

In operation, the controller determines an identifier of the playback device and/or the media playback system of which the playback device is a member, and the controller can do so in any of various ways. In some examples, the controller determines such an identifier when establishing a BLUETOOTH connection with the playback device. For instance, when attempting to establish or after establishing a BLUETOOTH connection with the playback device, the controller may receive a BLUETOOTH data packet identifying the device identifier of the playback device and/or the HHID of the media playback system. In other examples, the controller determines such an identifier when attempting to establish or after establishing a BLE connection with the playback device. For instance, the controller may receive a BLE advertisement that includes data identifying the device identifier of the playback device and/or the HHID of the media playback system. The controller may determine the identifier of the playback device and/or the media playback system in various other manners as well, which are contemplated herein.

Once the controller has determined the device identifier of the playback device and/or the HHID of the media playback system of the playback device, the controller may access the data structure 1000 to look up the corresponding encryption key data 1008. For instance, if the controller determines that the device identifier of the playback device is one of the identifiers represented by device identifier data 1006_a_ in data substructure 1002_a_, then the controller selects an encryption key represented by encryption key data 1008_a_ in data substructure 1002_a_. Likewise, if the controller determines that the HHID of the media playback system of the playback device is the HHID represented by HHID data 1004_a_ in data substructure 1002_a_, then the controller similarly selects an encryption key represented by encryption key data 1008_a_ in data substructure 1002_a_.

If the controller is unable to match the device identifier of the playback device and/or the HHID of the media playback system of the playback device to an associated encryption key in the data structure 1000, then the controller can proceed in a number of different ways. In some examples, the controller may refrain from communicating with the playback device. In other examples, the controller may continue to communicate with the playback device but do so using unencrypted communications. In still other examples, the controller may attempt to determine an encryption key for establishing secure communications with the playback device, such as by performing an encryption handshake procedure.

In examples where the controller is able to match the identifier of the playback device and/or the HHID of the media playback system of the playback device to a set of stored encryption keys in the data structure 1000, the particular encryption key selected by the controller from the set may depend on the type of communication the controller is attempting to engage in with the playback device. For instance, if the controller is attempting to engage in off-LAN communication with the playback device, such as by using a BLE communication channel to control the playback of media content streamed to the playback device over a BLUETOOTH communication channel, then the controller may select the off-LAN encryption key stored in the encryption key data 1008*a*. Alternatively, if the controller is attempting to engage in on-LAN communication with the playback device, such as by using an 802.11-based protocol to communicate with the playback device over a common data network of the media playback system, then the controller may select the off-LAN encryption key stored in the encryption key data 1008*a*.

The controller may then use the selected encryption key to engage in secure communications with the playback device. Using these techniques, the controller may identify and employ the appropriate encryption key for establishing secure communications with the playback device without having to perform a handshake technique for exchanging encryption keys each time the controller establishes a new communication session with the playback device.

While specific examples of the data structure 1000 and its use by the controller are described above, it should also be understood that the present disclosure contemplates other example embodiments as well. For instance, while FIG. 10 depicts the data structure 1000 as mapping the device identifier data 1006 to the encryption key data 1008 by way of the HHID data 1004, in other examples, the data structure 1000 can map the encryption key data 1008 directly to the device identifier data 1006. In some such examples, the encryption key data 1008 may include device-specific encryption keys. For instance, each playback device in the media playback system can be configured to generate or otherwise obtain and provide distinct encryption keys specific to each playback device. The controller can then store the device-specific encryption keys in direct association with the corresponding device identifier data 1006 in the data structure 1000.

Further, as noted above, some examples may involve the media playback system occasionally refreshing its various protocol-specific encryption keys to provide improved security, such that playback devices in the media playback system are configured to only employ a given encryption key for a temporary duration. The duration can be a predetermined amount of time, such as a number of days or weeks, or the duration can be based on certain trigger events. For example, a media playback system can be configured to refresh its encryption keys each time a software update is applied to any of the playback devices in the system. Thus, in order to help avoid attempts to use expired encryption keys, the controller can be configured to assign an expiration value to each of the encryption keys in the data structure 1000. The expiration value can similarly take the form of a predetermined time value or a value indicative of a trigger event, such as a software update. When the value indicates that an encryption key has expired, the controller can perform processes described herein to obtain a new encryption key and update the data structure 1000 accordingly.

Still further, while the present disclosure involves the generation and use of encryption keys for devices configured to use multiple different protocols, it should be understood that the encryption techniques described herein are not limited in that respect. Rather, in other examples, a controller and/or a playback device can be configured to use any or all of the disclosed techniques in connection with just a single communication protocol. And while the present disclosure involves communications between a controller and a playback device for controlling the playback of media content by the playback device, it should also be understood that the present disclosure is not limited to communication channels configured for that use. Rather, the encryption techniques described herein can be applied in connection with communication channels used for other purposes as well.

IV. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

Further, in light of the above detailed description, the present disclosure contemplates the following example features:

(Feature 1) A computing device comprising: at least one processor; at least one communication interface configured to facilitate communication using a first communication protocol, a second communication protocol that is different from the first communication protocol, and a third communication protocol that is different from the first and second communication protocols; at least one user interface; a non-transitory computer-readable medium; and program instructions stored on the non-transitory computer-readable medium that are executable by the at least one processor such that the computing device is configured to: (i) establish a first network connection to a playback device that supports the first communication protocol; (ii) send, to the playback device via the first network connection using the first communication protocol, audio content for playback; (iii) detect, via the at least one user interface, user input associated with a modification to the playback by one or more playback devices; (iv) determine a first encryption key for use when communicating with the playback device using the second communication protocol; (v) determine a second encryption key for use when communicating with the playback device using the third communication protocol; (vi) while the computing device and the playback device are connected to a common data network that supports the second communication protocol, transmit, via the common data network using the second communication protocol and the first encryption key, at least one command to modify media playback by the one or more playback devices based on the detected user input; and (vii) while at least one of the computing device or the playback device are not connected to the common data network that supports the second communication protocol, (a) establish a second network connection to the playback device that supports the third communication protocol, and (b) transmit, via the second network connection using the third communication protocol and the second encryption key, at least one command to modify media playback by the one or more playback devices based on the detected user input.

(Feature 2) The computing device of feature 1, further comprising program instructions stored on the non-transitory computer-readable medium that are executable by the at least one processor such that the computing device is configured to: while at least one of the computing device or the playback device are not connected to the common data network that supports the second communication protocol, receive, via the second network connection using the third communication protocol and the second encryption key, information identifying an operational status of the playback device.

(Feature 3) The computing device of feature 2, further comprising program instructions stored on the non-transitory computer-readable medium that are executable by the at least one processor such that the computing device is configured to: while at least one of the computing device or the playback device are not connected to the common data network that supports the second communication protocol, transmit, via the second network connection using the third communication protocol, a subscription request for a particular operational parameter of the playback device; and wherein the program instructions that are executable by the at least one processor such that the computing device is configured to receive, via the second network connection using the third communication protocol, information identifying an operational status of the playback device comprise program instructions that are executable by the at least one processor such that the computing device is configured to: based on the subscription request, receive, via the second network connection using the third communication protocol and the second encryption key, information corresponding to the particular operational parameter after the particular operational parameter changes.

(Feature 4) The computing device of feature 1, wherein the program instructions that are executable by the at least one processor such that the computing device is configured to establish the second network connection to the playback device that supports the third communication protocol comprise program instructions that are executable by the at least one processor such that the computing device is configured to establish the second network connection to the playback device that supports the third communication protocol based on having established the first network connection to the playback device that supports the first communication protocol.

(Feature 5) The computing device of feature 1, further comprising program instructions stored on the non-transitory computer-readable medium that are executable by the at least one processor such that the computing device is configured to: (i) terminate the first network connection to the playback device that supports the first communication protocol; and (ii) based on terminating the first network connection to the playback device, terminate the second network connection to the playback device that supports the third communication protocol.

(Feature 6) The computing device of feature 1, further comprising program instructions stored on the non-transitory computer-readable medium that are executable by the at least one processor such that the computing device is configured to: (i) after having established the second network connection to the playback device that supports the third communication protocol, determine that the computing device and the playback device are connected to the common data network that supports the second communication protocol; and (ii) based on the determination that the computing device and the playback device are connected to the common data network that supports the second communication protocol, terminate the second network connection to the playback device that supports the third communication protocol.

(Feature 7) The computing device of feature 1, wherein the one or more playback devices comprise one or more other playback devices different from the playback device, and wherein the computing device further comprises program instructions stored on the non-transitory computer-readable medium that are executable by the at least one processor such that the computing device is configured to: while the playback device and the one or more other playback devices are connected to the common data network that supports the second communication protocol, and while the computing device is not connected to the common data network that supports the second communication protocol, receive, via the second network connection using the third communication protocol and the second encryption key, information identifying (i) the one or more other playback devices and (ii) an operational status of the one or more other playback devices.

(Feature 8) The computing device of feature 1, wherein the program instructions that are executable by the at least one processor such that the computing device is configured to detect, via the at least one user interface, user input associated with the modification to the playback by the one or more playback devices comprise program instructions that are executable by the at least one processor such that the computing device is configured to detect user input associated with a first modification and a subsequent second modification to the playback by the one or more playback devices, and wherein the computing device further comprises program instructions stored on the non-transitory computer-readable medium that are executable by the at least one processor such that the computing device is configured to: (i) determine that the first and second modifications are for modifying a same playback parameter of the one or more playback devices; and (ii) based on (a) the determination that the first and second modifications are for modifying the same playback parameter of the one or more playback devices and (b) the second modification being subsequent to the first modification, refrain from transmitting, via the second network connection using the third communication protocol, a command corresponding to the first modification to the playback by the one or more playback devices.

(Feature 9) The computing device of feature 1, wherein the first communication protocol is a Bluetooth classic protocol, wherein the common data network that supports the second communication protocol is a wireless local area network (WLAN), and wherein the third communication protocol is a Bluetooth low energy (BLE) protocol.

(Feature 10) A non-transitory computer-readable medium, wherein the non-transitory computer-readable medium is provisioned with program instructions that, when executed by at least one processor, cause a computing device to: (i) establish, via at least one communication interface of the computing device, a first network connection to a playback device that supports a first communication protocol, wherein the at least one communication interface of the computing device is configured to facilitate communication using the first communication protocol, a second communication protocol that is different from the first communication protocol, and a third communication protocol that is different from the first and second communication protocols; (ii) send, to the playback device via the first network connection using the first communication protocol, audio content for playback; (iii) detect, via at least one user interface of the computing device, user input associated with a modification to the playback by one or more playback devices; (iv) determine a first encryption key for use when communicating with the playback device using the second communication protocol; (v) determine a second encryption key for use when communicating with the playback device using the third communication protocol; (vi) while the computing device and the playback device are connected to a common data network that supports the second communication protocol, transmit, via the common data network using the second communication protocol and the first encryption key, at least one command to modify media playback by the one or more playback devices based on the detected user input; and (vii) while at least one of the computing device or the playback device are not connected to the common data network that supports the second communication protocol, (a) establish a second network connection to the playback device that supports the third communication protocol, and (b) transmit, via the second network connection using the third communication protocol and the second encryption key, at least one command to modify media playback by the one or more playback devices based on the detected user input.

(Feature 11) The non-transitory computer-readable medium of feature 10, wherein the non-transitory computer-readable medium is also provisioned with program instructions that, when executed by at least one processor, cause the computing device to: while at least one of the computing device or the playback device are not connected to the common data network that supports the second communication protocol, receive, via the second network connection using the third communication protocol and the second encryption key, information identifying an operational status of the playback device.

(Feature 12) The non-transitory computer-readable medium of feature 11, wherein the non-transitory computer-readable medium is also provisioned with program instructions that, when executed by at least one processor, cause the computing device to: while at least one of the computing device or the playback device are not connected to the common data network that supports the second communication protocol, transmit, via the second network connection using the third communication protocol, a subscription request for a particular operational parameter of the playback device; and wherein the program instructions that, when executed by at least one processor, cause the computing device to receive, via the second network connection using the third communication protocol, information identifying an operational status of the playback device comprise program instructions that, when executed by at least one processor, cause the computing device to: based on the subscription request, receive, via the second network connection using the third communication protocol and the second encryption key, information corresponding to the particular operational parameter after the particular operational parameter changes.

(Feature 13) The non-transitory computer-readable medium of feature 10, wherein the program instructions that, when executed by at least one processor, cause the computing device to establish the second network connection to the playback device that supports the third communication protocol comprise program instructions that, when executed by at least one processor, cause the computing device to establish the second network connection to the playback device that supports the third communication protocol based on having established the first network connection to the playback device that supports the first communication protocol.

(Feature 14) The non-transitory computer-readable medium of feature 10, wherein the non-transitory computer-readable medium is also provisioned with program instructions that, when executed by at least one processor, cause the computing device to: (i) terminate the first network connection to the playback device that supports the first communication protocol; and (ii) based on terminating the first network connection to the playback device, terminate the second network connection to the playback device that supports the third communication protocol.

(Feature 15) The non-transitory computer-readable medium of feature 10, wherein the non-transitory computer-readable medium is also provisioned with program instructions that, when executed by at least one processor, cause the computing device to: (i) after having established the second network connection to the playback device that supports the third communication protocol, determine that the computing device and the playback device are connected to the common data network that supports the second communication protocol; and (ii) based on the determination that the computing device and the playback device are connected to the common data network that supports the second communication protocol, terminate the second network connection to the playback device that supports the third communication protocol.

(Feature 16) The non-transitory computer-readable medium of feature 10, wherein the one or more playback devices comprise one or more other playback devices different from the playback device, and wherein the non-transitory computer-readable medium is also provisioned with program instructions that, when executed by at least one processor, cause the computing device to: while the playback device and the one or more other playback devices are connected to the common data network that supports the second communication protocol, and while the computing device is not connected to the common data network that supports the second communication protocol, receive, via the second network connection using the third communication protocol and the second encryption key, information identifying (i) the one or more other playback devices and (ii) an operational status of the one or more other playback devices.

(Feature 17) The non-transitory computer-readable medium of feature 10, wherein the program instructions that, when executed by at least one processor, cause the computing device to detect, via the at least one user interface, user input associated with the modification to the playback by the one or more playback devices comprise program instructions that, when executed by at least one processor, cause the computing device to detect user input associated with a first modification and a subsequent second modification to the playback by the one or more playback devices, and wherein the non-transitory computer-readable medium is also provisioned with program instructions that, when executed by at least one processor, cause the computing device to: (i) determine that the first and second modifications are for modifying a same playback parameter of the one or more playback devices; and (ii) based on (a) the determination that the first and second modifications are for modifying the same playback parameter of the one or more playback devices and (b) the second modification being subsequent to the first modification, refrain from transmitting, via the second network connection using the third communication protocol, a command corresponding to the first modification to the playback by the one or more playback devices.

(Feature 18) The non-transitory computer-readable medium of feature 10, wherein the first communication protocol is a Bluetooth classic protocol, wherein the common data network that supports the second communication protocol is a wireless local area network (WLAN), and wherein the third communication protocol is a Bluetooth low energy (BLE) protocol.

(Feature 19) A method carried out by a computing device, the method comprising: (i) establishing, via at least one communication interface of the computing device, a first network connection to a playback device that supports a first communication protocol, wherein the at least one communication interface of the computing device is configured to facilitate communication using the first communication protocol, a second communication protocol that is different from the first communication protocol, and a third communication protocol that is different from the first and second communication protocols; (ii) sending, to the playback device via the first network connection using the first communication protocol, audio content for playback; (iii) detecting, via at least one user interface of the computing device, user input associated with a modification to the playback by one or more playback devices; (iv) determining a first encryption key for use when communicating with the playback device using the second communication protocol; (v) determining a second encryption key for use when communicating with the playback device using the third communication protocol; (vi) while the computing device and the playback device are connected to a common data network that supports the second communication protocol, transmitting, via the common data network using the second communication protocol and the first encryption key, at least one command to modify media playback by the one or more playback devices based on the detected user input; and (vii) while at least one of the computing device or the playback device are not connected to the common data network that supports the second communication protocol, (a) establishing a second network connection to the playback device that supports the third communication protocol, and (b) transmitting, via the second network connection using the third communication protocol and the second encryption key, at least one command to modify media playback by the one or more playback devices based on the detected user input.

(Feature 20) The method of feature 19, further comprising: while at least one of the computing device or the playback device are not connected to the common data network that supports the second communication protocol, receiving, via the second network connection using the third communication protocol and the second encryption key, information identifying an operational status of the playback device.

(Feature 21) The method of feature 20, further comprising: while at least one of the computing device or the playback device are not connected to the common data network that supports the second communication protocol, transmitting, via the second network connection using the third communication protocol, a subscription request for a particular operational parameter of the playback device; and wherein receiving, via the second network connection using the third communication protocol, information identifying an operational status of the playback device comprises: based on the subscription request, receiving, via the second network connection using the third communication protocol and the second encryption key, information corresponding to the particular operational parameter after the particular operational parameter changes.

(Feature 22) The method of feature 19, wherein establishing the second network connection to the playback device that supports the third communication protocol comprises establishing the second network connection to the playback device that supports the third communication protocol based on having established the first network connection to the playback device that supports the first communication protocol.

(Feature 23) The method of feature 19, further comprising: (i) terminating the first network connection to the playback device that supports the first communication protocol; and (ii) based on terminating the first network connection to the playback device, terminating the second network connection to the playback device that supports the third communication protocol.

(Feature 24) The method of feature 19, further comprising: (i) after having established the second network connection to the playback device that supports the third communication protocol, determining that the computing device and the playback device are connected to the common data network that supports the second communication protocol; and (ii) based on the determination that the computing device and the playback device are connected to the common data network that supports the second communication protocol, terminating the second network connection to the playback device that supports the third communication protocol.

(Feature 25) The method of feature 19, wherein the one or more playback devices comprise one or more other playback devices different from the playback device, and wherein the method further comprises: while the playback device and the one or more other playback devices are connected to the common data network that supports the second communication protocol, and while the computing device is not connected to the common data network that supports the second communication protocol, receiving, via the second network connection using the third communication protocol and the second encryption key, information identifying (i) the one or more other playback devices and (ii) an operational status of the one or more other playback devices.

(Feature 26) The method of feature 19, wherein detecting, via the at least one user interface, user input associated with the modification to the playback by the one or more playback devices comprises detecting user input associated with a first modification and a subsequent second modification to the playback by the one or more playback devices, and wherein the method further comprises: (i) determining that the first and second modifications are for modifying a same playback parameter of the one or more playback devices; and (ii) based on (a) the determination that the first and second modifications are for modifying the same playback parameter of the one or more playback devices and (b) the second modification being subsequent to the first modification, refraining from transmitting, via the second network connection using the third communication protocol, a command corresponding to the first modification to the playback by the one or more playback devices.

(Feature 27) The method of feature 19, wherein the first communication protocol is a Bluetooth classic protocol, wherein the common data network that supports the second communication protocol is a wireless local area network (WLAN), and wherein the third communication protocol is a Bluetooth low energy (BLE) protocol.

(Feature 28) A method for a computing device configured for facilitating communication using first, second, and third communication protocols, the method comprising: (i) establishing a first network connection to a playback device that supports the first communication protocol; (ii) sending, to the playback device via the first network connection using the first communication protocol, audio content for playback; (iii) detecting, via at least one user interface of the computing device, user input associated with a modification to the playback by one or more playback devices; (iv) when the computing device and the playback device are connected to a common data network that supports the second communication protocol, transmitting, via the common data network using the second communication protocol, at least one command to modify media playback by the one or more playback devices based on the detected user input; and (v) when at least one of the computing device or the playback device are not connected to the common data network that supports the second communication protocol, (a) establishing a second network connection to the playback device that supports the third communication protocol, and (b) transmitting, via the second network connection using the third communication protocol, at least one command to modify media playback by the one or more playback devices based on the detected user input.

(Feature 29) The method of feature 28, further comprising: when at least one of the computing device or the playback device are not connected to the common data network that supports the second communication protocol, receiving, via the second network connection using the third communication protocol, information identifying an operational status of the playback device.

(Feature 30) The method of feature 29, further comprising: when at least one of the computing device or the playback device are not connected to the common data network that supports the second communication protocol, transmitting, via the second network connection using the third communication protocol, a subscription request for a particular operational parameter of the playback device; and wherein receiving the information identifying an operational status of the playback device comprises, based on the subscription request, receiving the information corresponding to the particular operational parameter after the particular operational parameter changes.

(Feature 31) The method of one of features 28 to 30, wherein establishing the second network connection to the playback device that supports the third communication protocol is based on having established the first network connection to the playback device that supports the first communication protocol.

(Feature 32) The method of one of features 28 to 31, further comprising: (i) terminating the first network connection to the playback device that supports the first communication protocol; and (ii) based on terminating the first network connection to the playback device, terminating the second network connection to the playback device that supports the third communication protocol.

(Feature 33) The method of one of features 28 to 32, further comprising: (i) after having established the second network connection to the playback device that supports the third communication protocol, determining that the computing device and the playback device are connected to the common data network that supports the second communication protocol; and (ii) based on the determination that the computing device and the playback device are connected to the common data network that supports the second communication protocol, terminating the second network connection to the playback device that supports the third communication protocol.

(Feature 34) The method of one of features 28 to 33, wherein the one or more playback devices comprise one or more other playback devices different from the playback device, and the method further comprising: when the playback device and the one or more other playback devices are connected to the common data network that supports the second communication protocol, and the computing device is not connected to the common data network that supports the second communication protocol, receiving, via the second network connection using the third communication protocol, information identifying (i) the one or more other playback devices and (ii) an operational status of the one or more other playback devices.

(Feature 35) The method of one of features 28 to 34, wherein detecting, via the at least one user interface, user input associated with the modification to the playback by the one or more playback devices comprises detecting user input associated with a first modification and a subsequent second modification to the playback by the one or more playback devices, and the method further comprising: (i) determining that the first and second modifications are for modifying a same playback parameter of the one or more playback devices; and (ii) based on (a) the determination that the first and second modifications are for modifying the same playback parameter of the one or more playback devices and (b) the second modification being subsequent to the first modification, refraining from transmitting, via the second network connection using the third communication protocol, a command corresponding to the first modification to the playback by the one or more playback devices.

(Feature 36) The method of one of features 28 to 35, wherein: the first communication protocol is a Bluetooth classic protocol; the common data network that supports the second communication protocol is a wireless local area network (WLAN); and the third communication protocol is a Bluetooth low energy (BLE) protocol.

(Feature 37) The method of one of features 28 to 36, further comprising determining a first encryption key for use when communicating with the playback device using the second communication protocol.

(Feature 38) The method of feature 37, further comprising: using the first encryption key when communicating with the playback device using the second communication protocol.

(Feature 39) The method of feature 37 or 38, further comprising determining a second encryption key for use when communicating with the playback device using the third communication protocol.

(Feature 40) The method of feature 39, further comprising using the second encryption key when communicating with the playback device using the third communication protocol.

(Feature 41) The method of feature 29 in combination with feature 39 or 40, wherein receiving the information identifying the operational status of the playback device is received using the third communication protocol and the second encryption key.

(Feature 42) The method of feature 34 in combination with feature 39 or 40, wherein the information identifying the one or more other playback device and an operational status of the one or more other playback devices is received using the third communication protocol and the second encryption key.

(Feature 43) The method of one of features 37 to 42, wherein the first or second encryption key is based on a first or second public key of the media playback system.

(Feature 44) A non-transitory computer-readable medium, wherein the non-transitory computer-readable medium is provisioned with program instructions that, when executed by at least one processor, cause a computing device to perform the method of any preceding claim.

(Feature 45) A computing device comprising: at least one processor; at least one communication interface configured to facilitate communication using a first communication protocol, a second communication protocol that is different from the first communication protocol, and a third communication protocol that is different from the first and second communication protocols; at least one user interface; a non-transitory computer-readable medium; and program instructions stored on the non-transitory computer-readable medium that are executable by the at least one processor such that the computing device is configured to perform the method of one of features 28 to 43.

The invention claimed is:

1. A computing device comprising:

at least one processor;

at least one communication interface configured to facilitate communication using a first communication protocol, a second communication protocol that is different from the first communication protocol, and a third communication protocol that is different from the first and second communication protocols;

at least one user interface;

at least one non-transitory computer-readable medium; and program instructions stored on the at least one non-transitory computer-readable medium that are executable by the at least one processor such that the computing device is configured to:

establish a first network connection to a playback device that supports the first communication protocol;

send, via the first network connection using the first communication protocol, audio content for playback to the playback device;

detect, via the at least one user interface, user input indicating a modification to the playback of the audio content by the playback device;

while (i) the first network connection is established and (ii) the computing device and the playback device are connected to a common data network that supports the second communication protocol, transmit, via the common data network using the second communication protocol, at least one command to modify playback of the audio content by the playback device based on the detected user input; and while (i) the first network connection is established and (ii) at least one of the computing device or the playback device are not connected to a common data network that supports the second communication protocol, (i) establish a second network connection to the playback device that supports the third communication protocol, and (ii) transmit, via the second network connection using the third communication protocol, at least one command to modify playback of the audio content by the playback device based on the detected user input.

2. The computing device of claim 1, further comprising program instructions stored on the at least one non-transitory computer-readable medium that are executable by the at least one processor such that the computing device is configured to:

receive, via the second network connection using the third communication protocol, information identifying an operational status of the playback device.

3. The computing device of claim 2, further comprising program instructions stored on the at least one non-transitory computer-readable medium that are executable by the at least one processor such that the computing device is configured to:

transmit, via the second network connection using the third communication protocol, a subscription request for a particular operational parameter of the playback device; and wherein the program instructions that are executable by the at least one processor such that the computing device is configured to receive, via the second network connection using the third communication protocol, the information identifying the operational status of the playback device comprise program instructions that are executable by the at least one processor such that the computing device is configured to:

based on the subscription request, receive, via the second network connection using the third communication protocol, information corresponding to the particular operational parameter after the particular operational parameter changes.

4. The computing device of claim 1, wherein the program instructions that are executable by the at least one processor such that the computing device is configured to establish the second network connection to the playback device that supports the third communication protocol comprise program instructions that are executable by the at least one processor such that the computing device is configured to establish the second network connection to the playback device that supports the third communication protocol based on (i) having established the first network connection to the playback device that supports the first communication protocol and (ii) determining that at least one of the computing device or the playback device are not connected to a common data network that supports the second communication protocol.

5. The computing device of claim 1, further comprising program instructions stored on the at least one non-transitory computer-readable medium that are executable by the at least one processor such that the computing device is configured to:

terminate the first network connection to the playback device that supports the first communication protocol; and based on terminating the first network connection to the playback device, terminate the second network connection to the playback device that supports the third communication protocol.

6. The computing device of claim 1, further comprising program instructions stored on the at least one non-transitory computer-readable medium that are executable by the at least one processor such that the computing device is configured to:

after having established the second network connection to the playback device that supports the third communication protocol, determine that the computing device and the playback device are connected to a common data network that supports the second communication protocol; and based on the determination that the computing device and the playback device are connected to the common data network that supports the second communication protocol, terminate the second network connection to the playback device that supports the third communication protocol.

7. The computing device of claim 1, further comprising program instructions stored on the at least one non-transitory computer-readable medium that are executable by the at least one processor such that the computing device is configured to:

while (i) the first network connection is established, (ii) the playback device and one or more other playback devices are connected to a common data network that supports the second communication protocol, and (iii) the computing device is not connected to the common data network that supports the second communication protocol, receive, via the second network connection using the third communication protocol, information identifying (i) the one or more other playback devices and (ii) an operational status of the one or more other playback devices.

8. The computing device of claim 1, wherein the program instructions that are executable by the at least one processor such that the computing device is configured to detect, via the at least one user interface, the user input indicating the modification to the playback of the audio content by the playback device comprise program instructions that are executable by the at least one processor such that the computing device is configured to detect user input indicating a first modification and a subsequent second modification to the playback of the audio content by the playback device, and wherein the computing device further comprises program instructions stored on the at least one non-transitory computer-readable medium that are executable by the at least one processor such that the computing device is configured to:

determine that the first and second modifications are for modifying a same parameter that modifies playback of the audio content by the one or more playback device; and based on (i) the determination that the first and second modifications are for modifying the same parameter that modifies playback of the audio content by the playback device and (ii) the detection of the second modification subsequent to the first modification, refrain from transmitting, via the second network connection using the third communication protocol, a command corresponding to the first modification.

9. The computing device of claim 1, wherein the first communication protocol is a Bluetooth classic protocol, wherein a common data network that supports the second communication protocol comprises a wireless local area network (WLAN), and wherein the third communication protocol is a Bluetooth low energy (BLE) protocol.

10. The computing device of claim 1, further comprising program instructions stored on the at least one non-transitory computer-readable medium that are executable by the at least one processor such that the computing device is configured to:

determine (i) a first encryption key for use when communicating with the playback device using the second communication protocol and (ii) a second encryption key for use when communicating with the playback device using the third communication protocol;

wherein the program instructions that are executable by the at least one processor such that the computing device is configured to transmit, via the common data network using the second communication protocol, the at least one command to modify playback of the audio content by the playback device based on the detected user input comprise program instructions that are executable by the at least one processor such that the computing device is configured to transmit, via the common data network using the second communication protocol and the first encryption key, the at least one command to modify playback of the audio content by the playback device based on the detected user input; and wherein the program instructions that are executable by the at least one processor such that the computing device is configured to transmit, via the second network connection using the third communication protocol, the at least one command to modify playback of the audio content by the playback device based on the detected user input comprise program instructions that are executable by the at least one processor such that the computing device is configured to transmit, via the second network connection using the third communication protocol and the second encryption key, the at least one command to modify playback of the audio content by the playback device based on the detected user input.

11. The computing device of claim 1, further comprising program instructions stored on the at least one non-transitory computer-readable medium that are executable by the at least one processor such that the computing device is configured to:

determine whether the computing device and the playback device are connected to a common data network that supports the second communication protocol.

12. A non-transitory computer-readable medium, wherein the non-transitory computer-readable medium is provisioned with program instructions that, when executed by at least one processor, cause a computing device to:

establish a first network connection to a playback device that supports a first communication protocol, wherein the computing device comprises at least one communication interface configured to facilitate communication using the first communication protocol, a second communication protocol that is different from the first communication protocol, and a third communication protocol that is different from the first and second communication protocols;

send, via the first network connection using the first communication protocol, audio content for playback to the playback device;

detect, via at least one user interface of the computing device, user input indicating a modification to the playback of the audio content by the playback device;

while (i) the first network connection is established and (ii) the computing device and the playback device are connected to a common data network that supports the second communication protocol, transmit, via the common data network using the second communication protocol, at least one command to modify playback of the audio content by the playback device based on the detected user input; and while (i) the first network connection is established and (ii) at least one of the computing device or the playback device are not connected to a common data network that supports the second communication protocol, (i) establish a second network connection to the playback device that supports the third communication protocol, and (ii) transmit, via the second network connection using the third communication protocol, at least one command to modify playback of the audio content by the playback device based on the detected user input.

13. The non-transitory computer-readable medium of claim 12, wherein the non-transitory computer-readable medium is also provisioned with program instructions that, when executed by the at least one processor, cause the computing device to:

receive, via the second network connection using the third communication protocol, information identifying an operational status of the playback device.

14. The non-transitory computer-readable medium of claim 13, wherein the non-transitory computer-readable medium is also provisioned with program instructions that, when executed by the at least one processor, cause the computing device to:

transmit, via the second network connection using the third communication protocol, a subscription request for a particular operational parameter of the playback device; and wherein the program instructions that, when executed by at least one processor, cause the computing device to receive, via the second network connection using the third communication protocol, the information identifying the operational status of the playback device comprise program instructions that, when executed by at least one processor, cause the computing device to:

based on the subscription request, receive, via the second network connection using the third communication protocol, information corresponding to the particular operational parameter after the particular operational parameter changes.

15. The non-transitory computer-readable medium of claim 12, wherein the program instructions that, when executed by at least one processor, cause the computing device to establish the second network connection to the playback device that supports the third communication protocol comprise program instructions that, when executed by the at least one processor, cause the computing device to establish the second network connection to the playback device that supports the third communication protocol based on (i) having established the first network connection to the playback device that supports the first communication protocol and (ii) determining that at least one of the computing device or the playback device are not connected to a common data network that supports the second communication protocol.

16. The non-transitory computer-readable medium of claim 12, wherein the non-transitory computer-readable medium is also provisioned with program instructions that, when executed by the at least one processor, cause the computing device to:

terminate the first network connection to the playback device that supports the first communication protocol; and based on terminating the first network connection to the playback device, terminate the second network connection to the playback device that supports the third communication protocol.

17. The non-transitory computer-readable medium of claim 12, wherein the non-transitory computer-readable medium is also provisioned with program instructions that, when executed by the at least one processor, cause the computing device to:

after having established the second network connection to the playback device that supports the third communication protocol, determine that the computing device and the playback device are connected to a common data network that supports the second communication protocol; and based on the determination that the computing device and the playback device are connected to the common data network that supports the second communication protocol, terminate the second network connection to the playback device that supports the third communication protocol.

18. The non-transitory computer-readable medium of claim 12, wherein the non-transitory computer-readable medium is also provisioned with program instructions that, when executed by the at least one processor, cause the computing device to:

while (i) the first network connection is established, (ii) the playback device and one or more other playback devices are connected to a common data network that supports the second communication protocol, and (iii) the computing device is not connected to the common data network that supports the second communication protocol, receive, via the second network connection using the third communication protocol, information identifying (i) the one or more other playback devices and (ii) an operational status of the one or more other playback devices.

19. A method carried out by a computing device, the method comprising:

establishing a first network connection to a playback device that supports a first communication protocol, wherein the computing device comprises at least one communication interface configured to facilitate communication using the first communication protocol, a second communication protocol that is different from the first communication protocol, and a third communication protocol that is different from the first and second communication protocols;

sending, via the first network connection using the first communication protocol, audio content for playback to the playback device;

detecting, via at least one user interface of the computing device, user input indicating a modification to the playback of the audio content by the playback device;

while (i) the first network connection is established and (ii) the computing device and the playback device are connected to a common data network that supports the second communication protocol, transmitting, via the common data network using the second communication protocol, at least one command to modify playback of the audio content by the playback device based on the detected user input; and while (i) the first network connection is established and (ii) at least one of the computing device or the playback device are not connected to a common data network that supports the second communication protocol, (i) establishing a second network connection to the playback device that supports the third communication protocol, and (ii) transmitting, via the second network connection using the third communication protocol, at least one command to modify playback of the audio content by the playback device based on the detected user input.

20. The method of claim 19, further comprising:

receiving, via the second network connection using the third communication protocol, information identifying an operational status of the playback device.

21. The method of claim 20, further comprising:

transmitting, via the second network connection using the third communication protocol, a subscription request for a particular operational parameter of the playback device, wherein receiving, via the second network connection using the third communication protocol, the information identifying the operational status of the playback device comprises:

based on the subscription request, receiving, via the second network connection using the third communication protocol, information corresponding to the particular operational parameter after the particular operational parameter changes.

* * * * *